(12) United States Patent
Alshina et al.

(10) Patent No.: US 8,649,435 B2
(45) Date of Patent: *Feb. 11, 2014

(54) IMAGE DECODING METHOD WHICH OBTAINS A PREDICTED VALUE OF A CODING UNIT BY WEIGHTED AVERAGE OF PREDICTED VALUES

(71) Applicant: Samsung Electronics Co., Ltd., Gyeonggi-do (KR)

(72) Inventors: Elena Alshina, Suwon-si (KR); Alexander Alshin, Suwon-si (KR); Vadim Seregin, Suwon-si (KR); Nikolay Shlyakhov, Suwon-si (KR); Maxim Koroteev, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,499

(22) Filed: Nov. 27, 2012

(65) Prior Publication Data

US 2013/0083849 A1 Apr. 4, 2013

Related U.S. Application Data

(63) Continuation of application No. 13/002,398, filed as application No. PCT/KR2009/003634 on Jul. 2, 2009.

(60) Provisional application No. 61/077,592, filed on Jul. 2, 2008.

(30) Foreign Application Priority Data

Sep. 1, 2008 (KR) .................. 10-2008-0085914

(51) Int. Cl.
*H04N 7/12* (2006.01)

(52) U.S. Cl.
USPC ............ 375/240.12; 375/240.14; 375/240.16; 382/233

(58) Field of Classification Search
USPC ........................ 375/240.14, 240.16
See application file for complete search history.

(56) References Cited

U.S. PATENT DOCUMENTS

| 6,240,211 | B1 * | 5/2001 | Mancuso et al. ............. 382/236 |
| 7,660,354 | B2 * | 2/2010 | Shi et al. .................. 375/240.15 |
| 8,165,195 | B2 | 4/2012 | Song |
| 2005/0180502 | A1 * | 8/2005 | Puri ........................ 375/240.03 |
| 2006/0153300 | A1 * | 7/2006 | Wang et al. ............. 375/240.16 |
| 2006/0227863 | A1 | 10/2006 | Adams |
| 2006/0245497 | A1 | 11/2006 | Tourapis et al. |

(Continued)

OTHER PUBLICATIONS

International Search Report for PCT/KR2009/003634 issued Feb. 2, 2010 [PCT/ISA/210].

*Primary Examiner* — Jay Patel
*Assistant Examiner* — Jessica Prince
(74) *Attorney, Agent, or Firm* — Sughrue Mion, PLLC

(57) ABSTRACT

A video encoding method and apparatus and a video decoding method and apparatus. In the video encoding method, a first predicted coding unit of a current coding unit that is to be encoded is produced, a second predicted coding unit is produced by changing a value of each pixel of the first predicted coding unit by using each pixel of the first predicted coding unit and at least one neighboring pixel of each pixel, and the difference between the current coding unit and the second predicted coding unit is encoded, thereby improving video prediction efficiency.

4 Claims, 20 Drawing Sheets

(56) References Cited

U.S. PATENT DOCUMENTS

| | | |
|---|---|---|
| 2006/0274956 A1 | 12/2006 | Sohn et al. |
| 2007/0098067 A1 | 5/2007 | Kim et al. |
| 2007/0286286 A1* | 12/2007 | Heng et al. ............... 375/240.16 |
| 2008/0101707 A1 | 5/2008 | Mukherjee et al. |
| 2008/0240246 A1 | 10/2008 | Lee et al. |
| 2009/0003717 A1 | 1/2009 | Sekiguchi et al. |
| 2010/0208827 A1 | 8/2010 | Divorra Escoda et al. |

* cited by examiner

FIG. 7
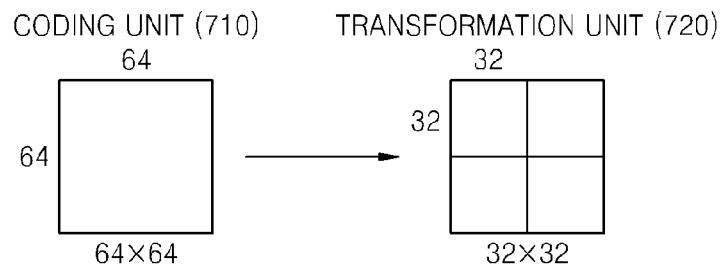
FIG. 8
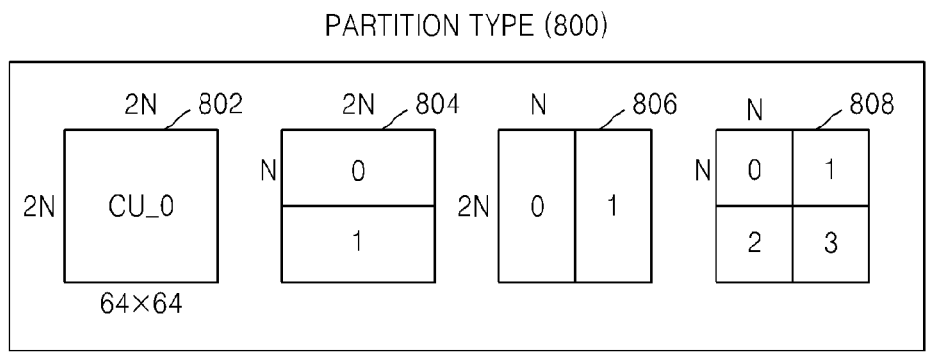
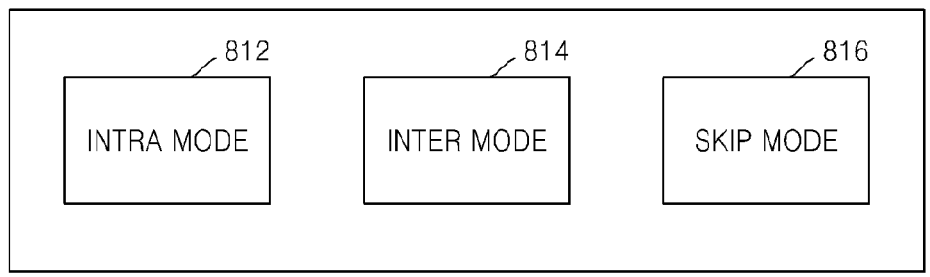
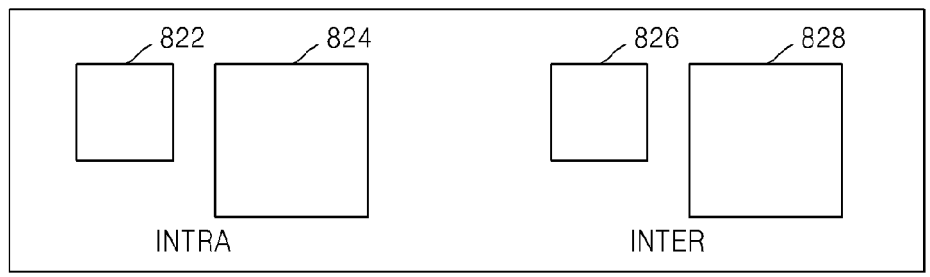

FIG. 10A
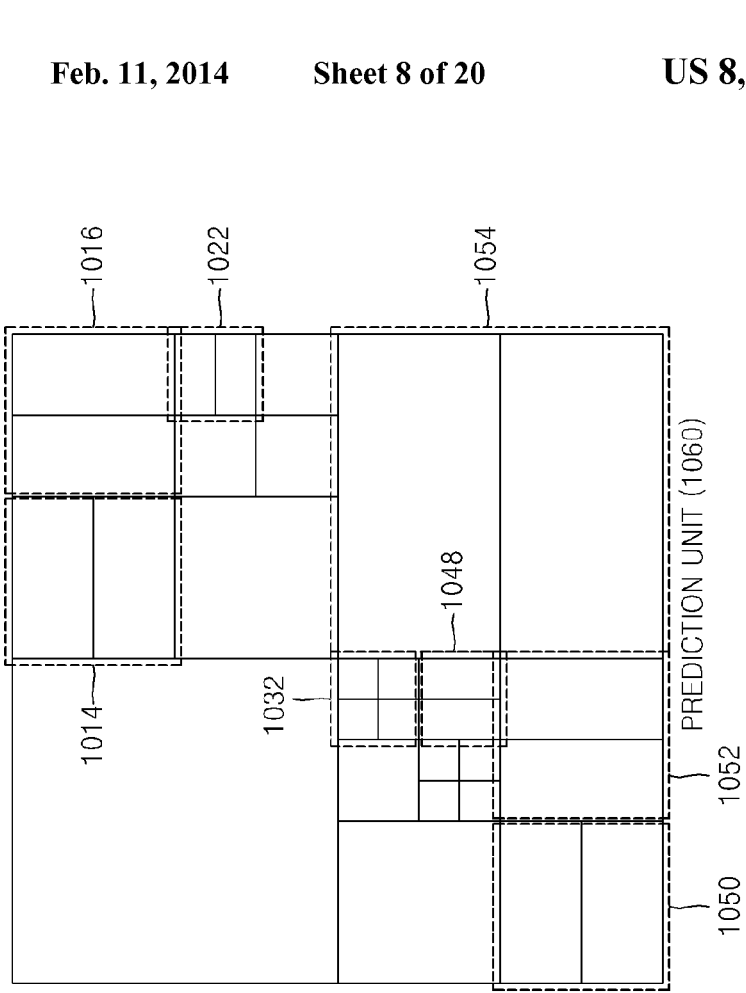
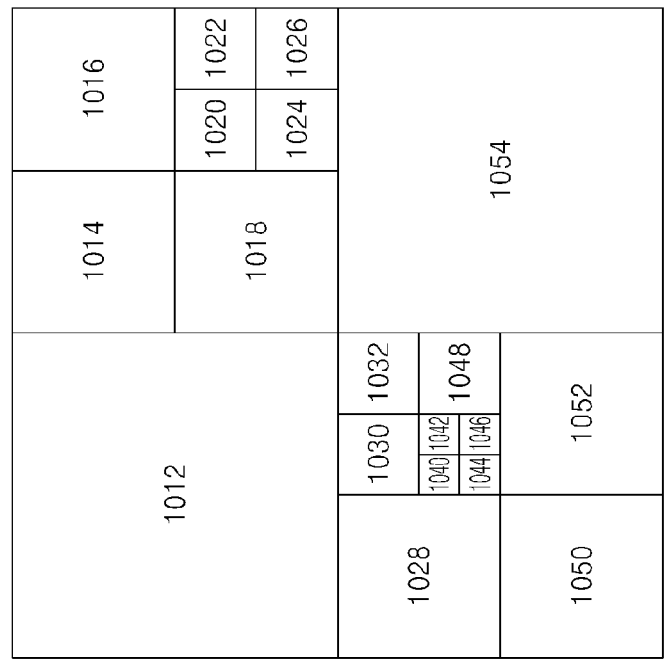

FIG. 11

| PARTITION TYPE | SPLIT : X | | | SPLIT : O |
|---|---|---|---|---|
| | PERFORM ENCODING FOR CURRENT DEPTH | | | SPLIT CURRENT CODING UNIT TO CODING UNIT HAVING UPPER DEPTH |
| | PREDICTION MODE | | SIZE OF TRANSFORMATION UNIT | |
| 2N×2N | INTRA MODE | INTRA MODE | SIZE OF FIRST INTRA TRANSFORMATION UNIT | PERFORM INDIVIDUAL ENCODING IN UNITS OF N×N CODING UNIT HAVING UPPER DEPTH |
| 2N×N | (ONLY IN THE CASE OF 2N×2N AND N×N CODING UNITS) | | SIZE OF SECOND INTRA TRANSFORMATION UNIT | |
| N×2N | INTER MODE | INTER MODE | SIZE OF FIRST INTER TRANSFORMATION UNIT | |
| N×N | (ONLY IN THE CASE OF 2N×2N CODING UNIT) | | SIZE OF SECOND INTER TRANSFORMATION UNIT | |

| SIZE OF CODING UNIT | NUMBER OF PREDICTION MODES | | |
|---|---|---|---|
| | Example 1 | Example 2 | Example 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

PREDICTION MODE DIRECTION

FIG. 15
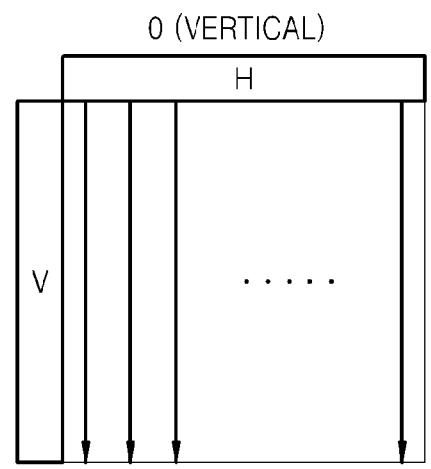
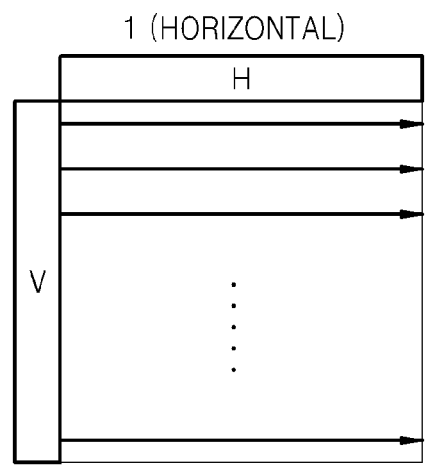
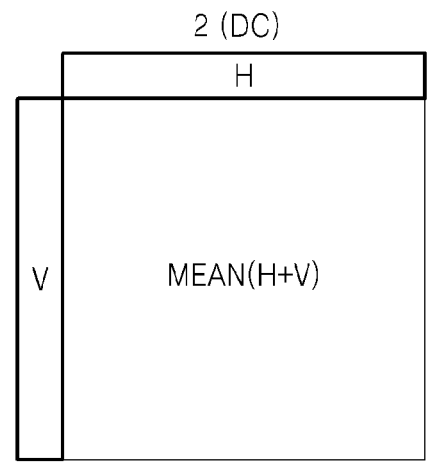
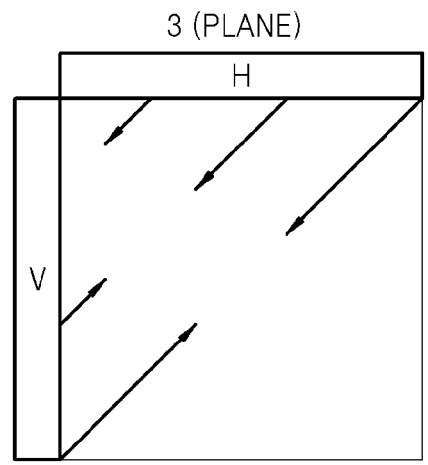
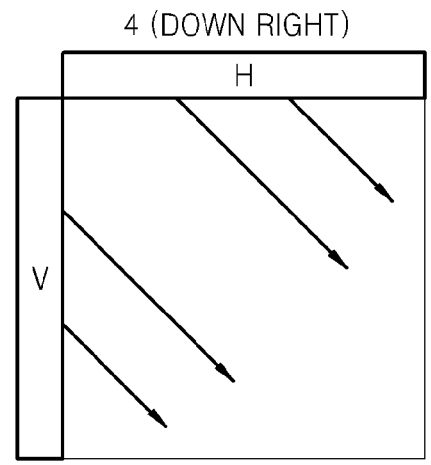

■ : NEIGHBORING PIXEL

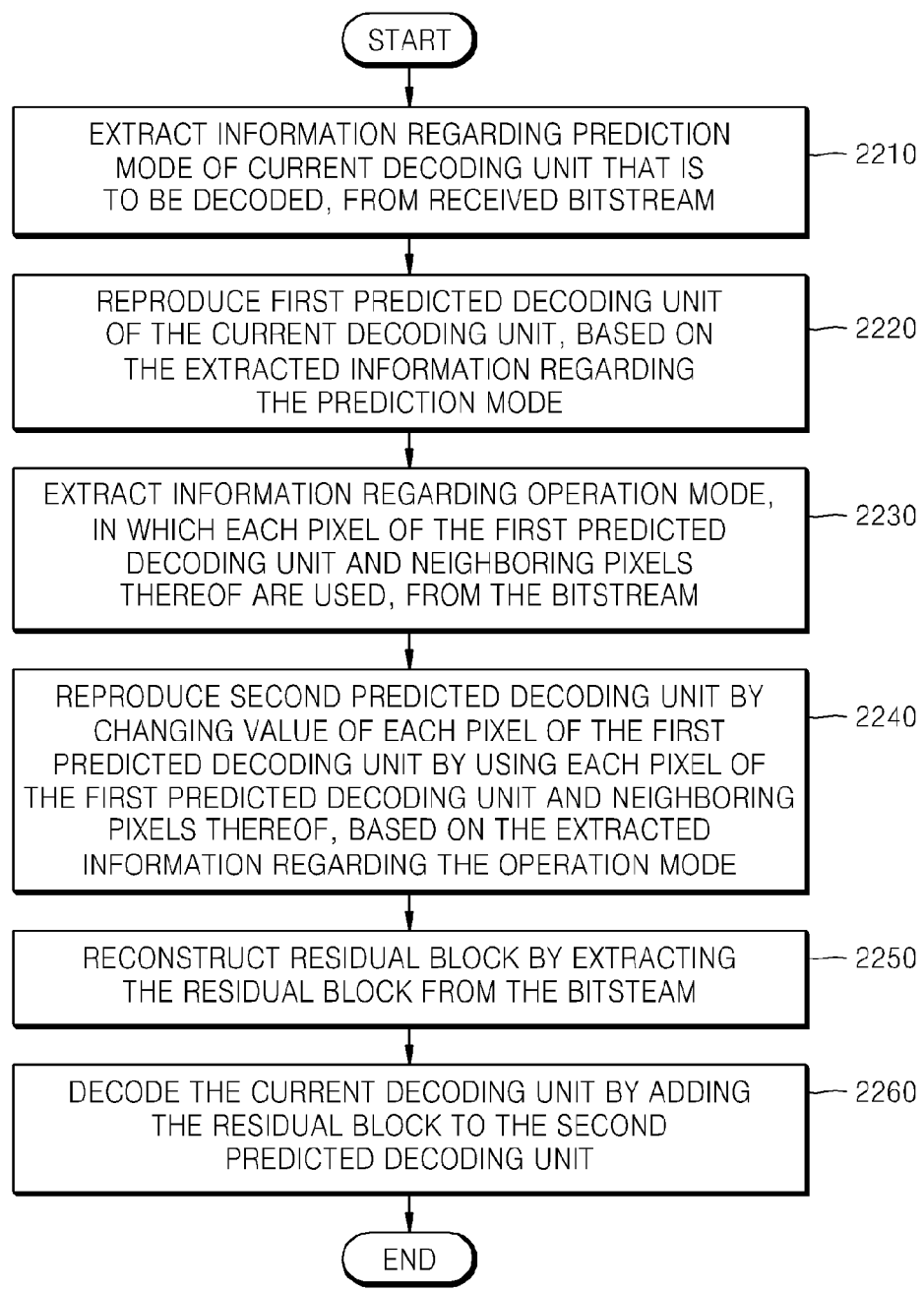

IMAGE DECODING METHOD WHICH OBTAINS A PREDICTED VALUE OF A CODING UNIT BY WEIGHTED AVERAGE OF PREDICTED VALUES

This a Continuation of application Ser. No. 13/002,398, filed Jan. 3, 2011, which is a National Stage of International Application No. PCT/KR2009/003634 filed Jul. 2, 2009, claiming priority based on U.S. Provisional Application No. 61/077,592 filed on Jul. 2, 2008, and Korean Patent Application No. 10-2008-0085914 filed on Sep. 1, 2008, in the Korean Intellectual Property Office, the disclosures of which are incorporated herein by reference in their entireties.

BACKGROUND

1. Field

One or more aspects of the exemplary embodiments relate to a video encoding method and apparatus and a video decoding method and apparatus are capable of improving video compression efficiency by post-processing predicted video data.

2. Description of the Related Art

In an image compression method, such as Moving Picture Experts Group (MPEG)-1, MPEG-2, MPEG-4, or H.264/MPEG-4 Advanced Video Coding (AVC), a picture is divided into macroblocks in order to encode an image. Each of the macroblocks is encoded in all encoding modes that can be used in inter prediction or intra prediction, and then is encoded in an encoding mode that is selected according to a bitrate used to encode the macroblock and a distortion degree of a decoded macroblock based on the original macroblock.

As hardware for reproducing and storing high resolution or high quality video content is being developed and supplied, a need for a video codec for effectively encoding or decoding the high resolution or high quality video content is increasing. In a conventional video codec, a video is encoded in units of macroblocks each having a predetermined size.

SUMMARY

One or more aspects of the exemplary embodiments provide a video encoding method and apparatus and a video decoding method and apparatus for improving video compression efficiency.

According to an aspect of the exemplary embodiments, a new predicted block is produced by changing a value of each pixel included in a predicted block by post-processing the predicted block.

According to an aspect of the exemplary embodiments, a new predicted block is produced by changing a value of each pixel included in a predicted block by post-processing the predicted block, thereby improving video compression efficiency.

According to an aspect of the exemplary embodiments, there is provided a method of encoding video, the method comprising: producing a first predicted coding unit of a current coding unit that is to be encoded; producing a second predicted coding unit by changing a value of each pixel of the first predicted coding unit by using each pixel of the first predicted coding unit and at least one neighboring pixel of each pixel; and encoding the difference between the current coding unit and the second predicted coding unit.

According to another aspect of the exemplary embodiments, there is provided an apparatus for encoding video, the apparatus comprising: a predictor for producing a first predicted coding unit of a current coding unit that is to be encoded; a post-processor for producing a second predicted coding unit by changing a value of each pixel of the first predicted coding unit by using each pixel of the first predicted coding unit and at least one neighboring pixel of each pixel; and an encoder for encoding the difference between the current coding unit and the second predicted coding unit.

According to another aspect of the exemplary embodiments, there is provided a method of decoding video, the method comprising: extracting information regarding a prediction mode of a current decoding unit, which is to be decoded, from a received bitstream; reproducing a first predicted decoding unit of the current decoding unit, based on the extracted information regarding the prediction mode; extracting information regarding an operation mode, in which each pixel of the first predicted decoding unit and neighboring pixels of each pixel are used, from the bitstream; reproducing a second predicted decoding unit by changing a value of each pixel of the first predicted decoding unit by using each pixel of the first predicted decoding unit and neighboring pixels of each pixel, based on the extracted information regarding the operation mode; extracting a residual block, which is the difference between the current decoding unit and the second predicted decoding unit, from the bitstream and restoring the residual block; and decoding the current decoding unit by adding the residual block to the second predicted decoding unit.

According to another aspect of the exemplary embodiments, there is provided an apparatus for decoding video, the apparatus comprising: an entropy decoder for extracting information regarding a prediction mode of a current decoding unit, which is to be decoded, and information regarding an operation mode, in which each pixel of a first predicted decoding unit of the current decoding unit and neighboring pixels of each pixel of the first predicted decoding unit are used, from a received bitstream; a predictor for reproducing the first predicted decoding unit, based on the extracted information regarding the prediction mode; a post-processor for reproducing a second predicted decoding unit by changing a value of each pixel of the first predicted decoding unit by using each pixel of the first predicted decoding unit and neighboring pixels of each pixel of the first predicted decoding unit, based on the extracted information regarding the operation mode; an inverse transformation and inverse quantization unit for reproducing a residual block that is the difference between the current decoding unit and the second predicted decoding unit, from the bitstream; and an adder for decoding the current decoding unit by adding the residual block to the second predicted decoding unit.

BRIEF DESCRIPTION OF THE DRAWINGS

FIG. 7 is a diagram for describing a relationship between a coding unit and a transformation unit, according to an exemplary embodiment.

FIG. 8 is a diagram for describing encoding information of coding units corresponding to a coding depth, according to an exemplary embodiment.

FIGS. 10A and 10B are diagrams illustrating a relationship between a coding unit, a prediction unit, and a transformation unit, according to an exemplary embodiment.

FIG. 11 is a table showing encoding information regarding each coding unit according to an exemplary embodiment.

FIG. 15 is drawings for explaining intra prediction modes that may be performed on a coding unit having a predetermined size, according to other exemplary embodiments.

FIG. 22 is a flowchart illustrating a method of decoding video according to an exemplary embodiment.

DETAILED DESCRIPTION OF EXEMPLARY EMBODIMENTS

Hereinafter, a video encoding method and apparatus and a video decoding method and apparatus according to exemplary embodiments, will be described with reference to the accompanying drawings.

Figure 1:
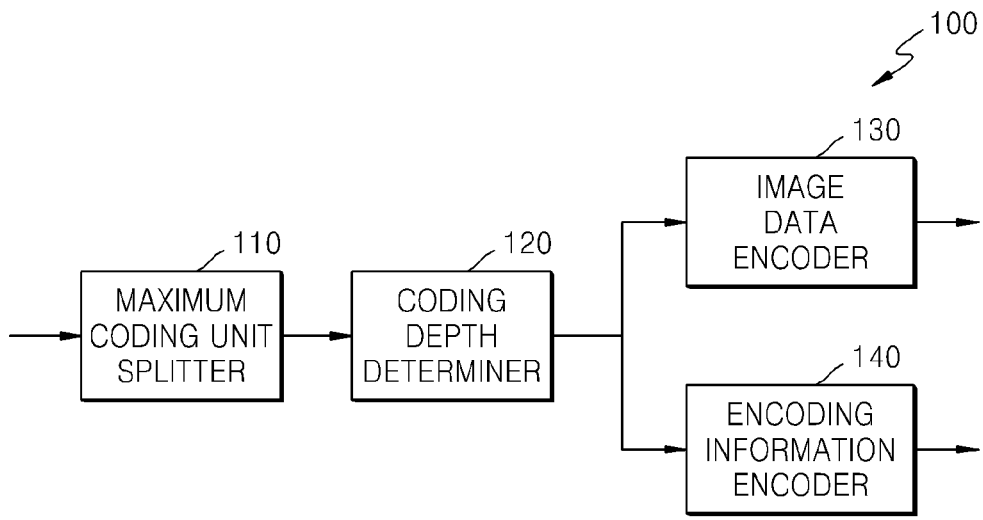
FIG. 1 is a block diagram of a video encoding apparatus according to an exemplary embodiment.

FIG. 1 is a block diagram of a video encoding apparatus 100 according to an exemplary embodiment. The video encoding apparatus 100 includes a maximum coding unit splitter 110, a coding depth determiner 120, an image data encoder 130, and an encoding information encoder 140.

The maximum coding unit splitter 110 may split a current picture or slice of an image, based on a maximum coding unit. The current picture or slice may be split into at least one maximum coding unit. The result of splitting may be output to the coding depth determiner 120 according to the at least one maximum coding unit.

According to an exemplary embodiment, coding unit may be characterized by a maximum coding unit and a depth. The maximum coding unit means a largest coding unit from among coding units of a current picture. The depth means a number of times a coding unit is hierarchically split from the maximum coding unit. As the depth deepens, deeper coding units according to depths may be split from the maximum coding unit to a minimum coding unit. A depth of the maximum coding unit may be an uppermost depth and a depth of the minimum coding unit may be a lowermost depth. Since a size of a coding unit corresponding to each depth decreases as the depth of the maximum coding unit deepens, a coding unit having a depth value 'k' may include a plurality of coding units each having a depth value larger than 'k+1'.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and width of the maximum coding unit are hierarchically split, may be predetermined. The maximum coding unit and the maximum depth may be set in picture or slice units. That is, each of the picture or slice units may have a different maximum coding unit and a different maximum depth, and the size of a minimum coding unit included in the maximum coding unit may be variably set according to the maximum depth. Since a maximum coding unit and a maximum depth may be variably set for each of the picture or slice units, video compression efficiency may be improved by encoding an image having a planar region by using the maximum coding unit having a relatively large size, and encoding an image having high complexity by using a coding unit having a relatively small size.

The coding depth determiner 120 determines a maximum depth in such a manner that different maximum depths are assigned to maximum coding units, respectively. The maximum depth may be determined based on rate-distortion (R-D) cost calculation. The determined maximum depth is provided to the encoding information encoder 140, and the image data of the maximum coding unit is transmitted to the image data encoder 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors. At least one coding depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to an upper depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coding depths may differ according to regions in the image data. Thus, one or more coding depths may be determined in one maximum coding unit, and the image data of the maximum coding unit may be divided according to coding units of at least one coding depth.

Also, sub coding units having different sizes, which are included in the maximum coding unit, may be predicted or transformed based on processing units having different sizes, respectively. In other words, the video encoding apparatus 100 may perform a plurality of operations for video encoding, based on processing units having different sizes and shapes. Encoding of video data includes various operations, e.g., prediction, transformation, and entropy encoding. Processing units having the same size may be used in all of the various operations, or processing units having different sizes may be used in the various operations, respectively.

For example, the video encoding apparatus 100 may select a processing unit that is different from a coding unit, so as to predict the coding unit. If the size of the coding unit is 2N×2N, then the size of the processing unit may be, for example, 2N×2N, 2N×N, N×2N, or N×N. Here, N denotes a positive integer. In other words, motion prediction may be performed in processing units obtained by splitting at least one of the height and width of the coding unit into two equal parts. Hereinafter, a data unit on which prediction is performed based will be referred to as a 'prediction unit'.

A prediction mode may include at least one from among an intra mode, a inter mode, and a skip mode. A particular prediction mode may be performed only on prediction units each having a predetermined size or shape. For example, the intra mode may be performed only on a prediction unit of 2N×2N or N×N. Also, the skip mode may be performed only on a prediction unit of 2N×2N. If a plurality of prediction units are included in a coding unit, prediction may be independently performed on the plurality of prediction units, and a prediction mode having a least encoding error may be selected.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. A data unit used as a base of the transformation will now be referred to as a 'transformation unit'.

The coding depth determiner 120 may determine a form into which the maximum coding unit is to be split in such a manner that the maximum coding unit may have an optimum encoding error, by measuring encoding errors of coding units corresponding to depths by using Lagrangian multiplier-based rate-distortion optimization. In other words, the coding depth determiner 120 may determine the type of sub coding units into which the maximum coding unit is split. Here, the size of each of the sub coding units varies according to a corresponding depth.

The image data encoder 130 encodes the image data of the maximum coding unit, based on the at least one coding depth determined by the coding depth determiner 120, and outputs the result of encoding in a bitstream. Since encoding has already been performed by the coding depth determiner 120 so as to measure the least encoding error, an encoded data stream may be output by using the result of encoding.

The encoding information encoder 140 encodes information about an encoding mode corresponding to each depth for each maximum coding unit, based on at least one coding depth determined by the coding depth determiner 120, and then outputs the result of encoding in a bitstream. The information about the encoding mode according to each depth may include information regarding the at least one coding depth, the partition type of a prediction unit of a coding unit having the at least one coding depth, a prediction mode of each prediction unit, and the size of a transformation unit.

The information about the coding depth may be defined by using split information according to depths, which indicates whether encoding is performed on coding units of an upper depth instead of a current depth. If the current depth of the current coding unit is the coding depth, image data in the current coding unit is encoded and output, and thus the split information may be defined not to split the current coding unit to an upper depth. Alternatively, if the current depth of the current coding unit is not the coding depth, the encoding is performed on the coding unit of the upper depth, and thus the split information may be defined to split the current coding unit to obtain the coding units of the upper depth.

If the current depth is not the coding depth, encoding is performed on the coding unit that is split into the coding unit of the upper depth. Since at least one coding unit of the upper depth exists in one coding unit of the current depth, the encoding is repeatedly performed on each coding unit of the upper depth, and thus the encoding may be recursively performed for the coding units having the same depth.

Since at least one coding depth should be determined for one maximum coding unit and information about at least one encoding mode should be determined for each coding depth, information about at least one encoding mode may be determined for one maximum coding unit. Also, a coding depth of the image data of the maximum coding unit may be different according to locations since the image data is hierarchically split according to depths, and thus information about the coding depth and the encoding mode may be set for the image data.

Accordingly, according to an exemplary embodiment, the encoding information encoder 140 may set encoding information about a coding depth of each minimum unit included in the maximum coding unit. That is, a coding unit having a coding depth includes at least one minimum coding unit that contains the same encoding information. Thus, if adjacent minimum coding units have the same encoding information according to depths, the adjacent minimum coding units may be minimum coding units included in the same maximum coding unit.

In the video encoding apparatus 100, the deeper coding unit may be a coding unit obtained by dividing a height or width of a coding unit of a lower depth, which is one layer above, by two. In other words, when the size of the coding unit of the current depth k is 2N×2N, the size of the coding unit of the upper depth (k+1) is N×N. Also, the coding unit of the current depth having the size of 2N×2N may include maximum 4 of the coding unit of the upper depth having the size of N×N.

Accordingly, the video encoding apparatus 100 may determine an optimum split form for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

If an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
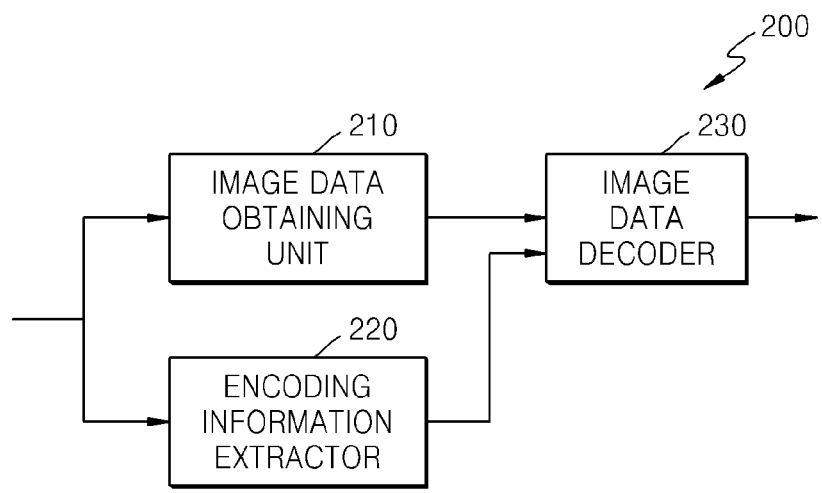
FIG. 2 is a block diagram of a video decoding apparatus according to an exemplary embodiment.

FIG. 2 is a block diagram of a video decoding apparatus 200 according to an exemplary embodiment.

The video decoding apparatus 200 includes an image data obtaining unit 210, an encoding information extractor 220, and an image data decoder 230.

The image data obtaining unit 210 parses a bitstream received by the video decoding apparatus 200 so as to obtain image data in maximum coding units, and transmits the image data to the image data decoder 230. The image data obtaining unit 210 may extract information regarding maximum coding units of a current picture or slice from a header of the current picture or slice. According to an exemplary embodiment, the video decoding apparatus 200 decodes the image data in the maximum coding units.

The encoding information extractor 220 parses the bitstream to extract information about a coding depth and an encoding mode for each of the maximum coding units from the header of the current picture or slice. The extracted information about the coding depth and the encoding mode is output to the image data decoder 230.

The information about the coding depth and the encoding mode according to the maximum coding unit may be set for information about at least one coding unit corresponding to the coding depth, and information about an encoding mode may include information about a partition type of a corresponding coding unit corresponding to the coding depth, about a prediction mode, and a size of a transformation unit. Also, splitting information according to depths may be extracted as the information about the coding depth.

Information regarding a form into which each of the maximum coding units is split may contain information regarding sub coding units having different sizes according to a depth of each of the maximum coding units. The information regarding the encoding mode may contain information regarding a prediction unit for each of the sub coding units, information regarding the prediction mode, information of the transformation unit, etc.

The image data decoder 230 reconstructs the current picture or slice by decoding the image data of each of the maximum coding units, based on the information extracted by the encoding information extractor 220. The image data decoder 230 may decode the sub coding units included in each of the maximum coding units, based on the information regarding a form into which each of the maximum coding units is split. The decoding may include intra prediction, motion estimation that includes motion compensation, and inverse transformation.

The image data decoder 230 restores the current picture by decoding the image data in each maximum coding unit based on the information about the coding depth and the encoding mode according to the maximum coding units. In other words, the image data decoder 230 may decode the encoded image data based on the extracted information about the partition type, the prediction mode, and the transformation unit for each coding unit from included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coding depths. Also, the image data decoder 230 may perform inverse transformation according to each transformation unit in the coding unit, based on the information about the size of the transformation unit of the coding unit according to coding depths, so as to perform the inverse transformation according to maximum coding units.

The image data decoder 230 may determine at least one coding depth of a current maximum coding unit by using split information according to depths. If the split information indicates that image data is no longer split in the current depth, the current depth is a coding depth. Accordingly, the image data decoder 230 may decode encoded data of at least one coding unit corresponding to the each coding depth in the current maximum coding unit by using the information about the partition type of the prediction unit, the prediction mode, and the size of the transformation unit for each coding unit corresponding to the coding depth, and output the image data of the current maximum coding unit.

The video decoding apparatus 200 may obtain information about at least one coding unit that generates the least encoding error when encoding is recursively performed for each maximum coding unit, and may use the information to decode the current picture. In other words, the optimum coding units in each maximum coding unit may be decoded. Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 3:
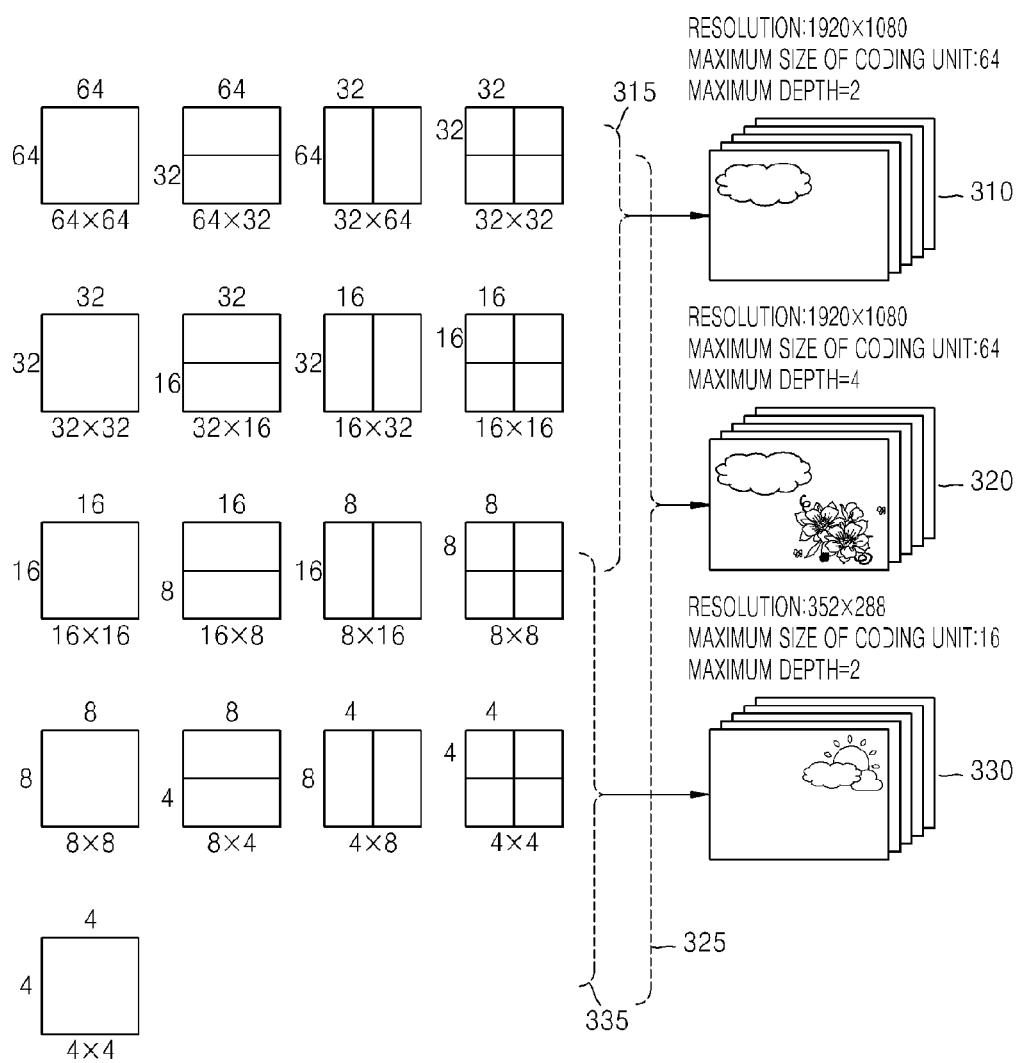
FIG. 3 is a diagram for describing a concept of hierarchical coding units according to an exemplary embodiment.

FIG. 3 is a diagram for describing a concept of hierarchical coding units according to an exemplary embodiment.

Referring to FIG. 3, the hierarchical coding units according to the current embodiment may include a 64×64 coding unit, a 32×32 coding unit, a 16×16 coding unit, an 8×8 coding unit, and a coding unit 4×4. However, the exemplary embodiment is not limited thereto, and the size of a coding unit may be, for example, 64×32, 32×64, 32×16, 16×32, 16×8, 8×16, 8×4, or 4×8.

In video data 310, a resolution is 1920×1080, a maximum size of a coding unit is 64, and a maximum depth is 2. In video data 320, a resolution is 1920×1080, a maximum size of a coding unit is 64, and a maximum depth is 4. In video data 330, a resolution is 352×288, a maximum size of a coding unit is 16, and a maximum depth is 2.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 2, coding units 335 of the video data 330 may include a maximum coding unit having a long axis size of 16, and coding units having a long axis size of 8 or 4 since depths are deepened to two layer by splitting the maximum coding unit twice.

Since the maximum depth of the video data 320 is 4, coding units 325 of the video data 320 may include a maximum coding unit having a long axis size of 64, and coding units having long axis sizes of 32, 16, 8 and 4 since the depths are deepened to 4 layers by splitting the maximum coding unit four times. As a depth deepens, detailed information may be precisely expressed.

Figure 4:
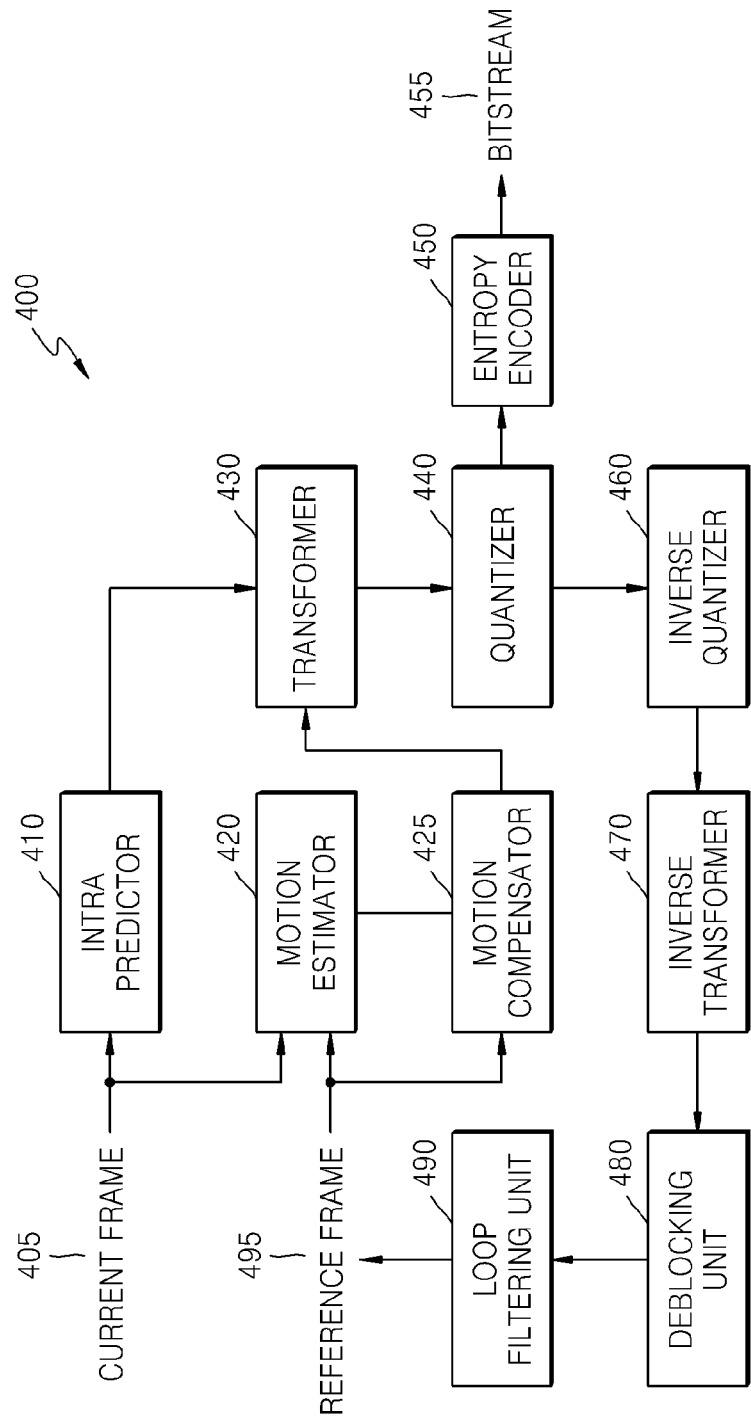
FIG. 4 is a block diagram of an image encoder based on coding units according to an exemplary embodiment.

FIG. 4 is a block diagram of an image encoder 400 based on coding units, according to an exemplary embodiment.

Referring to FIG. 4, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. In particular, as will be described later with reference to FIG. 12, the intra predictor 410 may perform post-processing, in which a value of each pixel of an intra-predicted coding unit is changed using neighboring pixels. Residual values that are the differences between the values of the post-processed coding unit and the original coding unit, may be sequentially output to the transformer 430 and the quantizer 440, and then be finally output as a quantized transformation coefficient.

The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit. Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
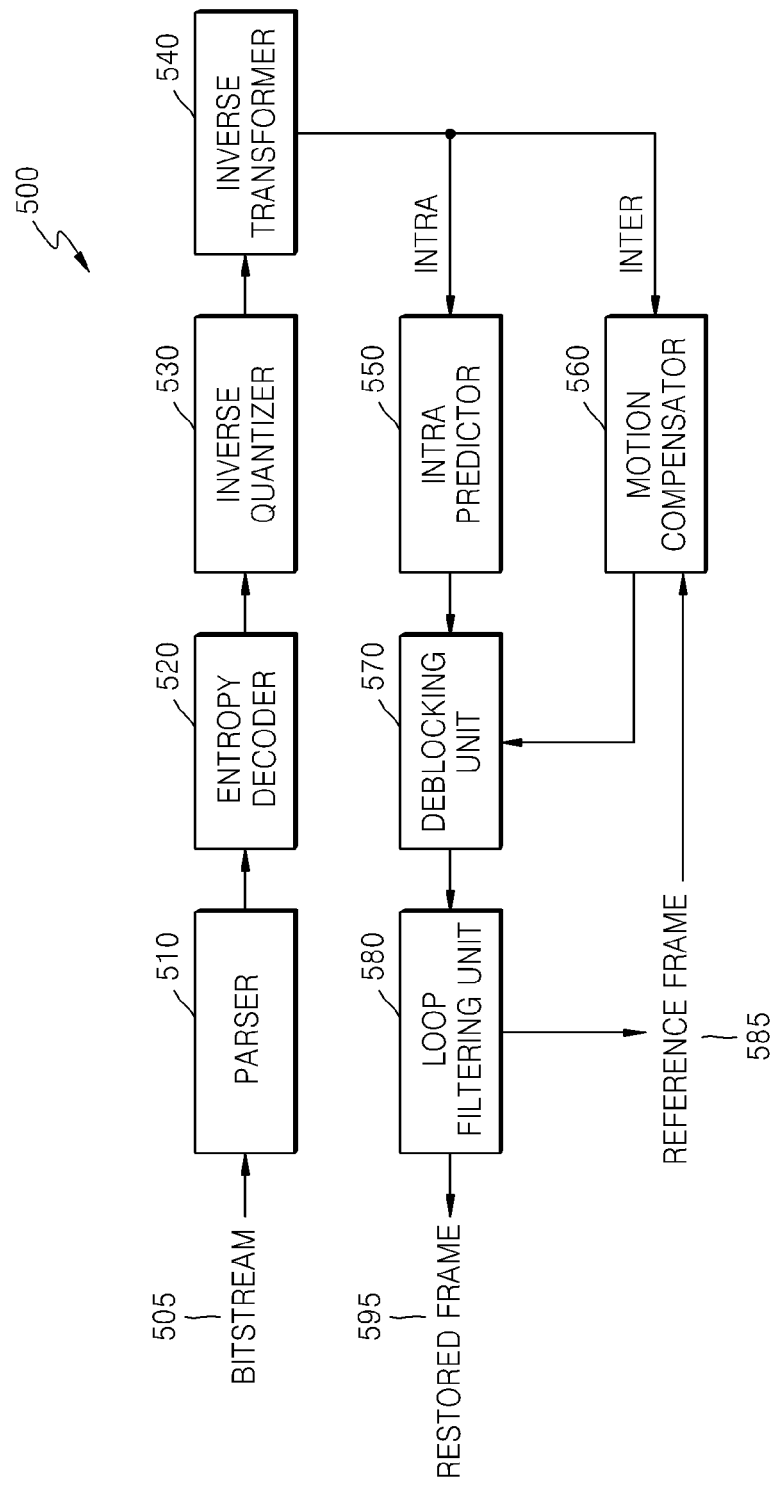
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540. The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order for the image decoder 500 to be applied in the video decoding method according to an exemplary embodiment, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit. Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
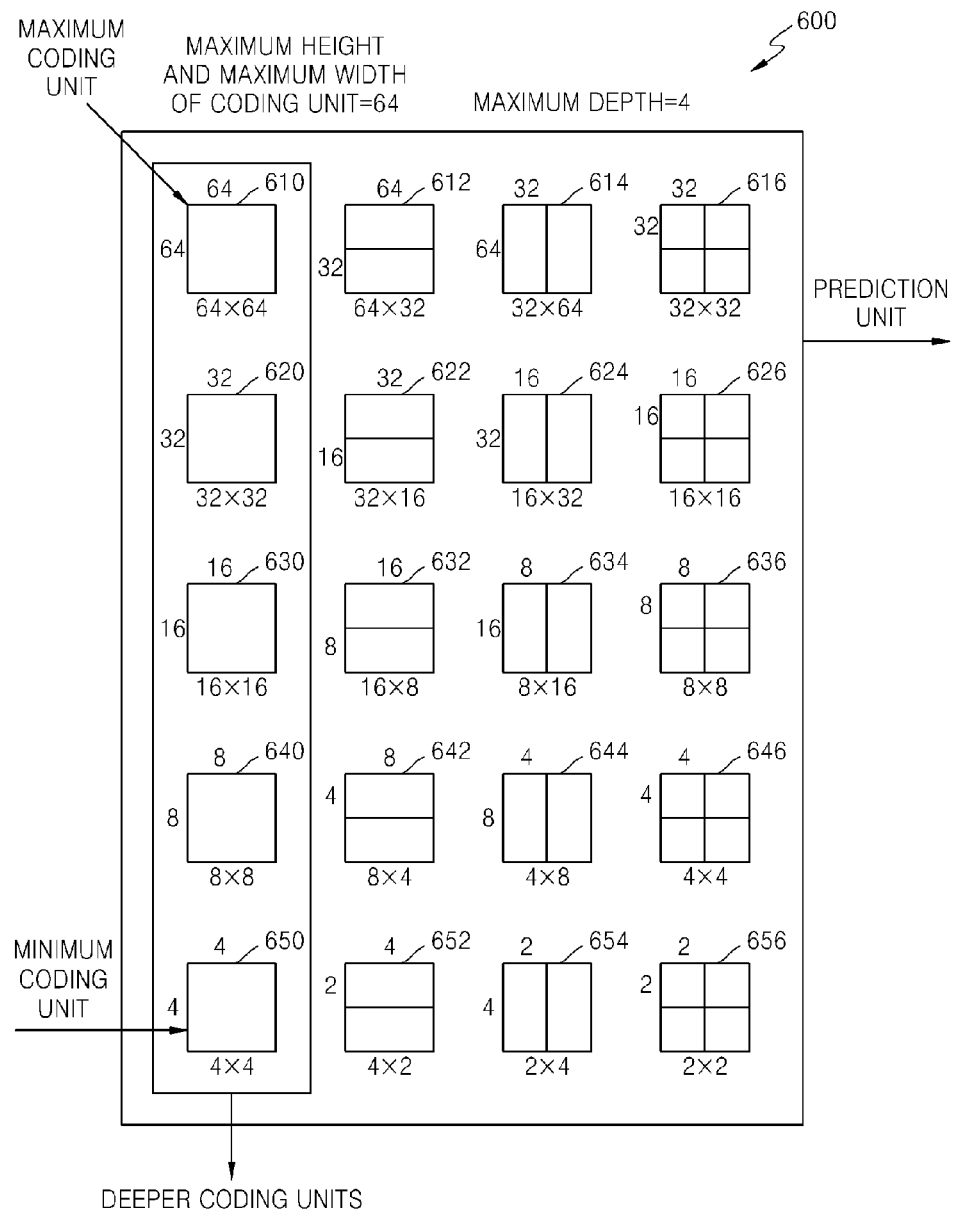
FIG. 6 is a diagram illustrating deeper coding units according to depths, and a prediction unit according to an exemplary embodiment.

FIG. 6 is a diagram illustrating deeper coding units according to depths, and partitions, according to an exemplary embodiment. The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a maximum coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

Also, referring to FIG. 6, partitions of each coding unit are arranged as prediction units of the coding unit according to a depth and along the horizontal axis. In other words, prediction units of the maximum coding unit 610 having a size of 64×64 and a depth of 0 may include the maximum coding unit 610 having a size of 64×64, and partitions included in the maximum coding unit 610, i.e., partitions 612 having the size of 64×32, partitions 614 having the size of 32×64, and partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coding depth of the coding units constituting the maximum coding unit 610, the coding depth determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the least encoding error may be searched for by comparing the least encoding errors according to depths, by performing encoding for each depth as the depth deepens along the vertical axis of the hierarchical structure 600. A depth and a partition having the least encoding error in the maximum coding unit 610 may be selected as the coding depth and a partition type of the maximum coding unit 610.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit. For example, in the video encoding apparatus 100 or 200, if a size of the coding unit 710 is 64×64, transformation may be performed by using the transformation units 720 having a size of 32×32. Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coding depth, according to an exemplary embodiment. The encoding information encoder 140 of the video encoding apparatus 100 may encode and transmit information-partition type 800 about a partition type, information-prediction mode 810 about a prediction mode, and information-transformation unit 820 about a size of a transformation unit for each coding unit corresponding to a coding depth, as information about an encoding mode.

The information-partition type 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information-partition type 800 about a partition type is set to indicate one of the partition 804 having a size of 2N×N, the partition 806 having a size of N×2N, and the partition 808 having a size of N×N.

The information-prediction mode 810 indicates a prediction mode of each partition. For example, the information-prediction mode 810 may indicate a mode of prediction encoding performed on a partition indicated by the information-partition type 800, i.e., an intra mode 812, an inter mode 814, or a skip mode 816.

The information-transformation unit 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The encoding information extractor 220 of the video decoding apparatus 200 may extract and use the information-partition type 800, information-prediction mode 810, and information-transformation unit 820 for decoding, according to each deeper coding unit.

Figure 9:
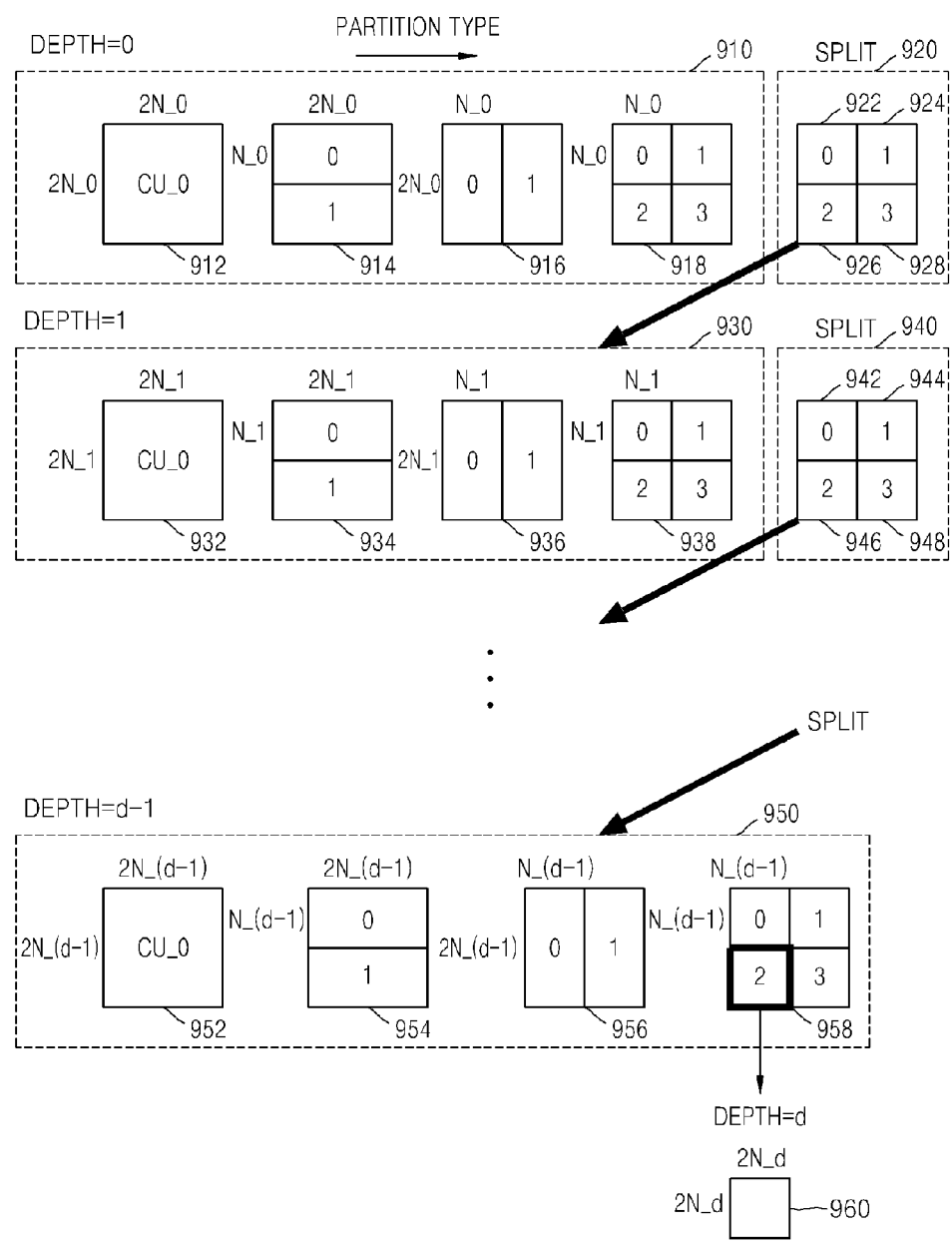
FIG. 9 is a diagram of deeper coding units according to depths, according to an exemplary embodiment.

FIG. 9 is a diagram of deeper coding units according to depths, according to an exemplary embodiment. Split information may be used to indicate a change of a depth. The spilt information indicates whether a coding unit of a current depth is split into coding units of an upper depth.

A prediction unit 910 for motion-prediction encoding a coding unit 900 having a depth of 0 and a size of 2N_0×2N_0, may include partitions of a partition type 912 having a size of 2N_0×2N_0, a partition type 914 having a size of 2N_0×N_0, a partition type 916 having a size of N_0×2N_0, and a partition type 918 having a size of N_0×N_0.

Motion-prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. An intra mode and the motion-prediction encoding in an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is the smallest in the partition type 918 having a size of N_0×N_0, a depth is changed from '0' to '1' to split the partition type 918 in operation 920, and encoding is repeatedly performed on coding units 922, 924, 926 and 928 having a depth of 2 and a size of N_0×N_0 to search for a least encoding error.

Since encoding is repeatedly performed on the coding units 922, 924, 926, and 928 having the same depth, encoding of a coding unit having a depth of 1 will be described by using a coding unit from among the coding units 922, 924, 926, and 928. A prediction unit 930 for motion-predicting a coding unit having a depth of 1 and a size of 2N_1×2N_1 (=N_0×N_0), may include partitions of a partition type 932 having a size of 2N_1×2N_1, a partition type 934 having a size of 2N_1×N_1, a partition type 936 having a size of N_1×2N_1, and a partition type 938 having a size of N_1×N_1. Encoding is repeatedly performed on one partition having a size of 2N_1×2N_1, two partitions having a size of 2N_1×N_1, two partitions having a size of N_1×2N_1, and four partitions having a size of N_1×N_1, according to each partition type and by using motion estimation.

If the encoding error is the smallest in the partition type 938 having the size of N_1×N_1, the current depth is increased from '1' to '2' in operation 940, and encoding is repeatedly performed on coding units 942, 944, 946, and 948 having a depth of 2 and a size of N_2×N_2 so as to search for a least encoding error.

If a maximum depth is 'd', then split information corresponding to depths may be set to a depth of (d−1). That is, a prediction unit 950 for motion-predicting a coding unit having a depth of d−1 and a size of 2N_(d−1)×2N_(d_1), may include partitions of a partition type 952 having a size of 2N_(d−1)×2N_(d_1), a partition type 954 having a size of 2N_(d−1)×N_(d_1), a partition type 956 having a size of N_(d−1)×2N_(d_1), and a partition type 958 having a size of N_(d−1)×N_(d_1).

Encoding is repeatedly performed on one partition having a size of 2N_(d−1)×2N_(d_1), two partitions having a size of 2N_(d−1)×N_(d__1), two partitions having a size of N_(d−1)×2N_(d__1), and four partitions having a size of N_(d−1)×N_(d__1), according to each partition type and by using motion estimation. Since the maximum depth is 'd', the coding unit 952 having the depth of (d−1) is not any more split.

The video encoding apparatus 100 according to an exemplary embodiment compares encoding errors according to depths with one another and selects a depth corresponding to the least encoding error, so as to determine a coding depth for the partition type 912. For example, in case of a coding unit having a depth of 0, the partition types 912, 914, 916, and 918 are individually encoded by performing motion estimation thereon, and a prediction unit having a least encoding error is selected from among the partition types 912, 914, 916, and 918. Similarly, a prediction unit having a least encoding error may be determined for each of depths of 0, 1, . . . , d−1. In the case of the depth of d, an encoding error may be determined by performing motion estimation based on a prediction unit 960 that is a coding unit having a size of 2N_d×2N_d. As described above, the least encoding errors corresponding to the depths of 0, 1, . . . , d−1 are compared with one another, and a depth having a least encoding error is selected as a coding depth from among the least encoding errors. The coding depth and a prediction unit corresponding to the coding depth may be encoded and transmitted as information regarding an encoding mode. Also, since a coding unit should be split from the depth of 0 to the coding depth, only split information regarding the coding depth is set to '0', and split information regarding the other depths is set to '1'.

The encoding information extractor 220 of the video decoding apparatus 200 may extract and use the information about the coding depth and the prediction unit of the coding unit 900 to decode the partition 912. The video decoding apparatus 200 may determine a depth, in which split information is 0, as a coding depth by using split information according to depths, and use information about an encoding mode of the corresponding depth for decoding.

Figure 10B:
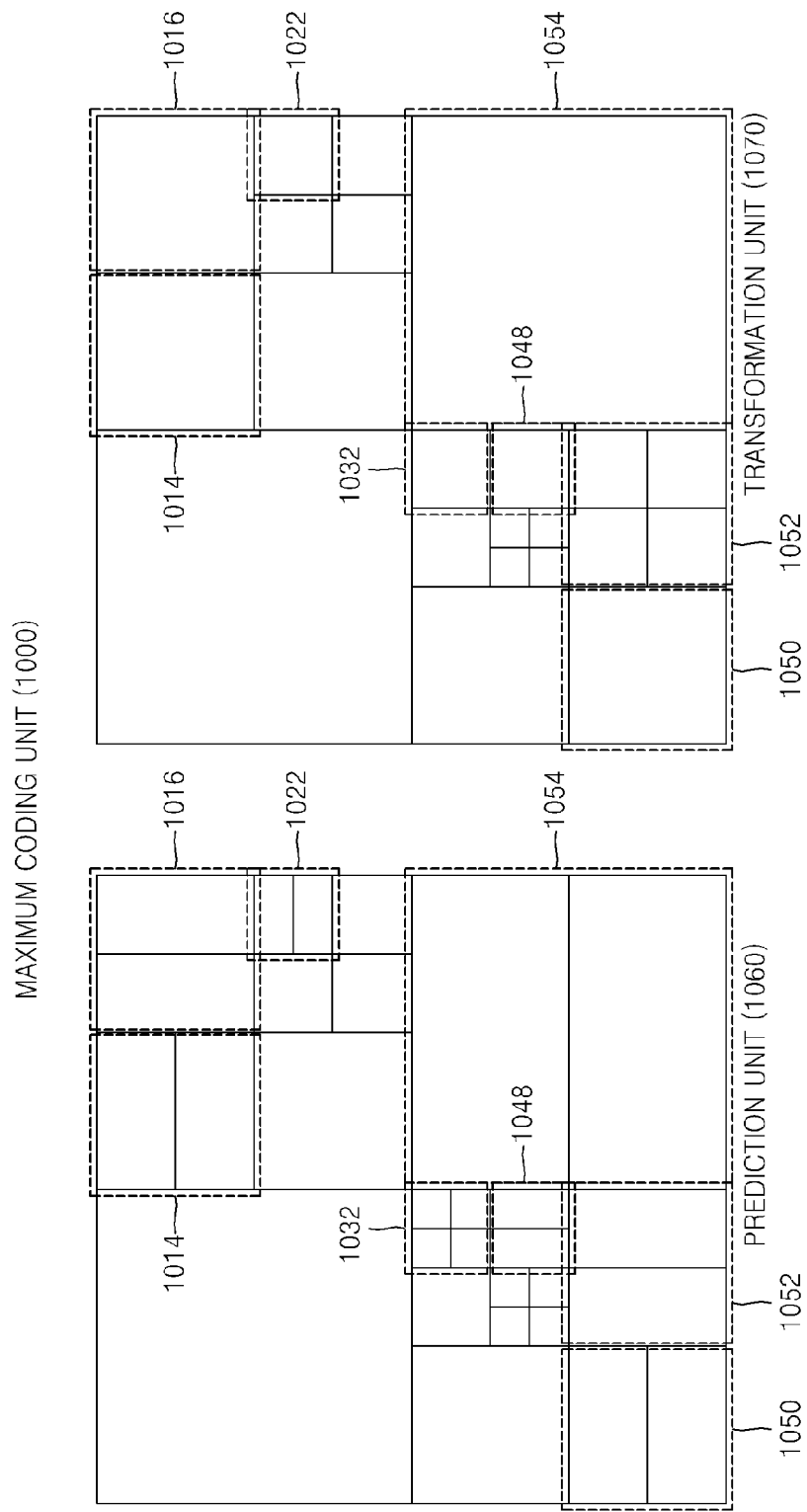

FIGS. 10A and 10B are diagrams for describing a relationship between coding units 1010, prediction units 1060, and transformation units 1070, according to an exemplary embodiment.

The coding units 1010 are coding units corresponding to coding depths determined by the video encoding apparatus 100, for a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some prediction units 1014, 1016, 1022, 1032, 1048, 1050, 1052, and 1054 are obtained by splitting the coding units in the coding units 1010. In other words, the prediction units 1014, 1022, 1050, and 1054 are partition type having a size of 2N×N, the prediction unit 1016, 1048, and 1052 are partition type having a size of N×2N, and the prediction unit 1032 is partition type having a size of N×N. Prediction units and partitions of the coding units 1010 are smaller than or equal to each coding unit.

Transformation or inverse transformation is performed on image data of the coding units 1052 and 1054 in the transformation units 1070 in a data unit that is smaller than the coding units 1052 and 1054. Also, the transformation units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

FIG. 11 is a table showing encoding information regarding each coding unit according to an exemplary embodiment.

The encoding information encoder 140 of the video encoding apparatus 100 illustrated in FIG. 1 may encode the encoding information regarding each coding unit, and the encoding information extractor 220 of the video decoding apparatus 200 illustrated in FIG. 2 may extract the encoding information regarding each coding unit.

The encoding information may contain split information regarding each coding unit, information regarding a partition type of each coding unit (hereinafter, referred to as "partition type information"), a prediction mode, and the size of a transformation unit. The encoding information illustrated in FIG. 11 is just an example of encoding information that the video encoding apparatus 100 and the video decoding apparatus 200 may set, and thus, the inventive concept is not limited thereto.

The split information may indicate a coding depth of a corresponding coding unit. That is, since the coding depth is a depth that cannot be split according to the split information, partition type information, a prediction mode, and a size of a transformation unit may be defined with respect to the coding depth. When a current depth is split once more according to the split information, encoding may be individually performed on four coding units corresponding to upper depths.

In the split type information, the split type of a transformation unit of the coding unit having the coding depth, may be represented as one of 2N×2N, 2N×N, N×2N, and N×N. In the prediction mode, a motion estimation mode may be represented as one of an intra mode, an inter mode, and a skip mode. The intra mode may be defined only when a partition type includes 2N×2N and N×N. The skip mode may be defined only when a partition type includes 2N×2N. The size of the transformation unit may be set in such a manner that two sizes are set in the intra mode, and two sizes are set in the inter mode.

Each minimum coding unit included in a coding unit may contain encoding information regarding each coding unit corresponding to a coding depth thereof. Thus, it is possible to determine whether a current coding unit is one of coding units belonging to the same coding depth by checking encoding information of adjacent minimum coding units. Also, coding units corresponding to a current coding depth may be checked by using encoding information of a minimum coding unit. Accordingly, a distribution of coding depths in a maximum coding unit may be derived.

Intra prediction that is performed by the intra predictor 410 of the video encoding apparatus 100 of FIG. 1 and the intra predictor 550 of the video decoding apparatus of FIG. 2 according to exemplary embodiments, will now be described in detail. In the following descriptions, it should be understood that the term, 'coding unit' is related to an encoding process of an image and is referred to as a 'decoding unit' related to a decoding process of an image. That is, in the following descriptions, the terms, 'the coding unit' and 'the decoding unit' indicate the same thing and are different only in that whether the encoding process or the decoding process is performed. For the consistency of terms, except for a particular case, the coding unit and the decoding unit may be referred to as a coding unit in both the encoding and decoding processes.

Figures 12, 13:
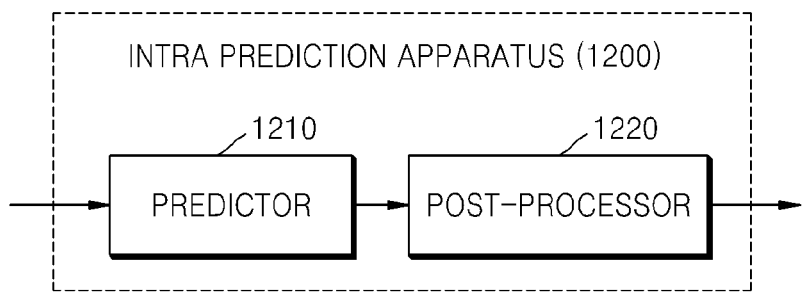
FIG. 12 is a block diagram of an intra prediction apparatus according to an exemplary embodiment.
FIG. 13 is a table showing a number of intra prediction modes according to the size of a coding unit, according to an exemplary embodiment.

FIG. 12 is a block diagram of an intra prediction apparatus 1200 according to an exemplary embodiment. Referring to FIG. 12, the intra prediction apparatus 1200 includes a predictor 1210 and a post-processor 1220. The predictor 1210 intra predicts a current coding unit by using intra prediction modes determined according to the size of the current coding unit, and outputs a first predicted coding unit. The post-processor 1220 performs post-processing by using neighboring pixels of pixels that constitute the first predicted coding unit so as to change the values of the pixels of the first predicted coding unit, and then outputs a second predicted coding unit that is post-processed.

FIG. 13 is a table showing a number of intra prediction modes according to the size of a coding unit, according to an exemplary embodiment. According to an exemplary embodiment, a number of intra prediction modes may be determined according to the size of a coding unit (a decoding unit in the case of a decoding process). Referring to FIG. 13, if the size of a coding unit that is to be intra predicted is, for example, N×N, then numbers of intra prediction modes that are to be actually performed on coding units having sizes of 2×2, 4×4, 8×8, 16×16, 32×32, 64×64, and 128×128 may be 5, 9, 9, 17, 33, 5, and 5, respectively (Example 2). The reason why a number of intra prediction modes that are to be actually performed is determined according to the size of a coding unit, is because overhead for encoding prediction mode information varies according to the size of the coding unit. In other words, although a small-sized coding unit occupies a small area in an entire image, overhead for transmitting additional information, e.g., a prediction mode, regarding the small-sized coding unit may be large. Thus, when a small-sized coding unit is encoded using too many prediction modes, a number of bits may increase, thus degrading compression efficiency. A large-sized coding unit, e.g., a coding unit having a size of 64×64 or more, is highly likely to be selected as a coding unit for a flat region of an image. Compression efficiency may also be degraded when a large-sized coding unit selected to encode such a flat region is encoded using too many prediction modes.

Thus, according to an exemplary embodiment, coding unit size may be largely classified into at least three sizes: N1×N1 (2≤N1≤8, N1 denotes an integer), N2×N2 (16≤N2≤32, N2 denotes an integer), and N3×N3 (64≤N3, N3 denotes an integer). If a number of intra prediction modes that are to be performed on each coding unit having a size of N1×N1 is A1 (A1 denotes a positive integer), a number of intra prediction modes that are to be performed on each coding unit having a size of N2×N2 is A2 (A2 denotes a positive integer), and a number of intra prediction modes that are to be performed on each coding unit having a size of N3×N3 is A3 (A3 denotes a positive integer), then a number of intra prediction modes that are to be performed according to the size of a coding unit, may be determined to satisfy 'A3≤A1≤A2'. That is, if a current picture is divided into a small-sized coding unit, a medium-sized coding unit, and a large-sized coding unit, then a number of prediction modes that are to be performed on the medium-sized coding unit may be greater than those of prediction modes to be performed on the small-sized coding unit and the large-sized coding unit. However, the exemplary embodiments are not limited thereto and a large number of prediction modes may also be set to be performed on the small-sized and medium-sized coding units. The numbers of prediction modes according to the size of each coding unit illustrated in FIG. 13 is just an example and may thus be variable.

Figures 14A, 14B:
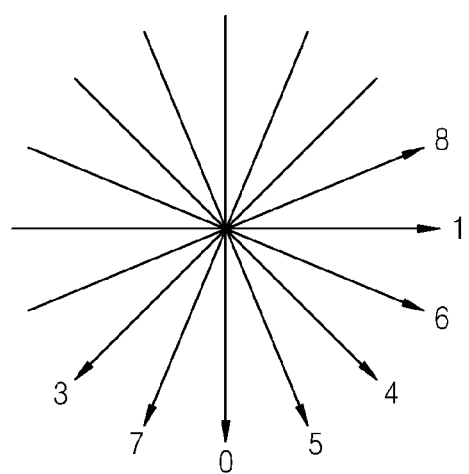
FIGS. 14A to 14C are diagrams for explaining intra prediction modes that may be performed on a coding unit having a predetermined size, according to exemplary embodiments.
Figure 14C:
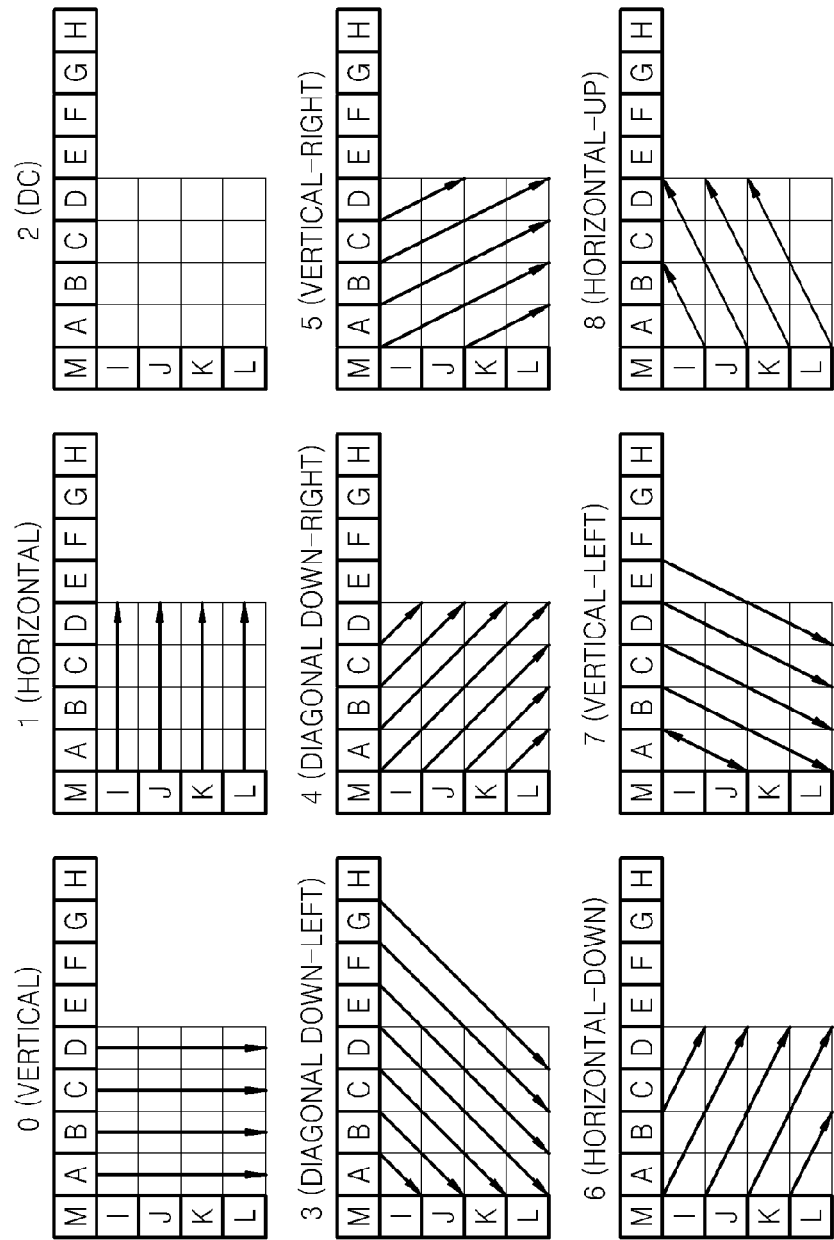

FIGS. 14A to 14C are drawings for explaining intra prediction modes that may be performed on a coding unit having a predetermined size, according to exemplary embodiments. Specifically, FIG. 14A is a table showing intra prediction modes that may be performed on a coding unit having a predetermined size, according to an exemplary embodiment. Referring to FIGS. 13 and 14A, for example, if a coding unit having a size of 4×4 is intra predicted, a vertical mode (mode 0), a horizontal mode (mode 1), a direct-current (DC) mode (mode 2), a diagonal down-left mode (mode 3), a diagonal down-right mode (mode 4), a vertical-right mode (mode 5), a horizontal-down mode (mode 6), a vertical-left mode (mode 7), or a horizontal-up mode (mode 8) may be performed.

FIG. 14B illustrate directions of the intra prediction modes illustrated in FIG. 14A, according to an exemplary embodiment. In FIG. 14B, values assigned to arrows denote mode values when prediction is performed in directions indicated with the arrows, respectively. Here, mode 2 is a DC prediction mode having no direction and is thus not illustrated in FIG. 14B.

FIG. 14C illustrate intra prediction methods that may be performed on the coding unit illustrated in FIG. 14A, according to an exemplary embodiment. Referring to FIG. 14C, a predicted coding unit is produced using neighboring pixels A to M of a current coding unit according to an available intra prediction mode determined according to the size of the current coding unit. For example, a method of prediction encoding a current coding unit having a size of 4×4 according to the vertical mode (mode 0) of FIG. 14A, will be described. First, values of the pixels A to D adjacent to the top of the 4×4 coding unit are predicted as values of the 4×4 coding unit. Specifically, the values of the pixel A are predicted as four values of pixels at a first column of the 4×4 coding unit, the values of the pixel B are predicted as four values of pixels at a second column of the 4×4 coding unit, the values of the pixel C are predicted as four values of pixels at a third column of the 4×4 coding unit, and the values of the pixel D are predicted as four values of pixels at a fourth column of the 4×4 current coding unit. Then, error values between actual values of pixels included in a predicted 4×4 coding unit predicted using the pixels A to D and the original 4×4 coding unit are calculated and encoded.

FIG. 15 is drawings for explaining intra prediction modes that may be performed on a coding unit having a predetermined size, according to other exemplary embodiments. Referring to FIGS. 13 and 15, for example, if a coding unit having a size of 2×2 is intra predicted, a total of five modes, e.g., a vertical mode, a horizontal mode, a DC mode, a plane mode, and a diagonal down-right mode, may be performed.

As illustrated in FIG. 13, if a coding unit having a size of 32×32 has 33 intra prediction modes, then directions of the 33 intra prediction modes should be set. According to an exemplary embodiment, a prediction direction for selecting neighboring pixels to be used as reference pixels based on pixels included in a coding unit, is set by using a 'dx' parameter and a 'dy' parameter so as to set intra prediction modes having various directionalities in addition to the intra prediction modes described above with reference to FIGS. 14A-C and 15. For example, when each of the 33 prediction modes is defined as mode N (N is an integer from 0 to 32), mode 0, mode 1, mode 2, and mode 3 are set as a vertical mode, a horizontal mode, a DC mode, and a plane mode, respectively, and each of mode 4 to mode 31 may be set as a prediction mode having a directionality of $\tan^{-1}(dy/dx)$ by using a (dx, dy) parameter expressed with one from among (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) shown in Table 1.

TABLE 1

| mode # | dx | dy |
| --- | --- | --- |
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 |

Mode 0, mode 1, mode 2, mode 3, and mode 32 denote a vertical mode, a horizontal mode, a DC mode, a plane mode, and a Bi-linear mode, respectively.

Mode 32 may be set as a bi-linear mode that uses bi-linear interpolation as will be described later with reference to FIG. 17.

Figure 16:
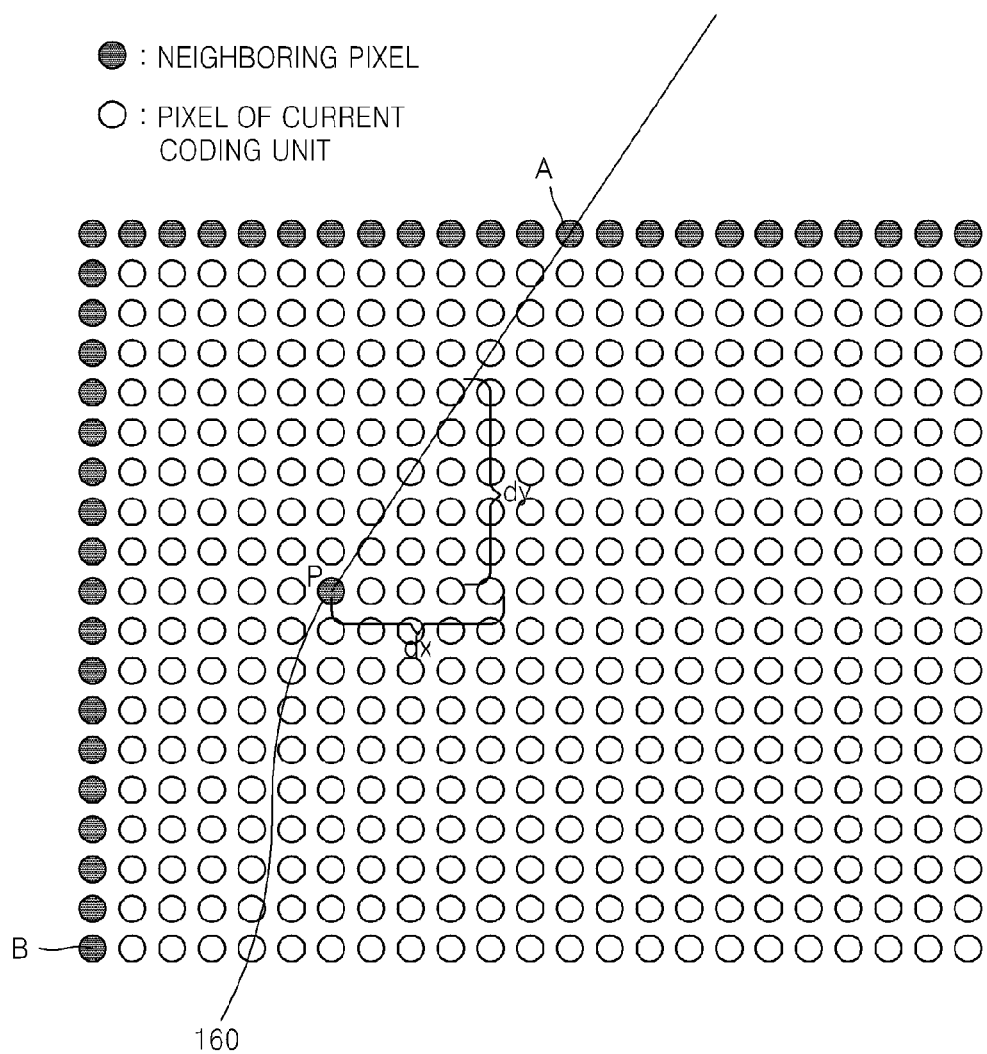
FIG. 16 is a reference diagram for explaining inter prediction modes having various directionalities according to an exemplary embodiment.

FIG. 16 is a reference diagram for explaining inter prediction modes having various directionalities according to exemplary embodiments. As described above with reference to Table 1, each of intra prediction modes according to exemplary embodiments may have directionality of $\tan^{-1}(dy/dx)$ by using a plurality of (dx, dy) parameters.

Referring to FIG. 16, neighboring pixels A and B on a line 160 that extends from a current pixel P in a current coding unit, which is to be predicted, at an angle of $\tan^{-1}(dy/dx)$ determined by a value of a (dx, dy) parameter according to a mode, shown in Table 1, may be used as predictors of the current pixel P. In this case, the neighboring pixels A and B may be pixels that have been previously encoded and restored, and belong to previous coding units located above and to the left side of the current coding unit. Also, when the line 160 does not pass along neighboring pixels on locations each having an integral value but passes between these neighboring pixels, neighboring pixels closer to the line 160 may be used as predictors of the current pixel P. If two pixels that meet the line 160, e.g., the neighboring pixel A located above the current pixel P and the neighboring pixel B located to the left side of the current pixel P, are present, an average of values of the neighboring pixels A and B may be used as a predictor of the current pixel P. Otherwise, if a product of values of the 'dx' and 'dy' parameters is a positive value, the neighboring pixel A may be used, and if the product of the values of the 'dx' and 'dy' parameters is a negative value, the neighboring pixel B may be used.

The intra prediction modes having various directionalities shown in Table 1 may be predetermined by an encoding side and a decoding side, and only an index of an intra prediction mode of each coding unit may be transmitted.

Figure 17:
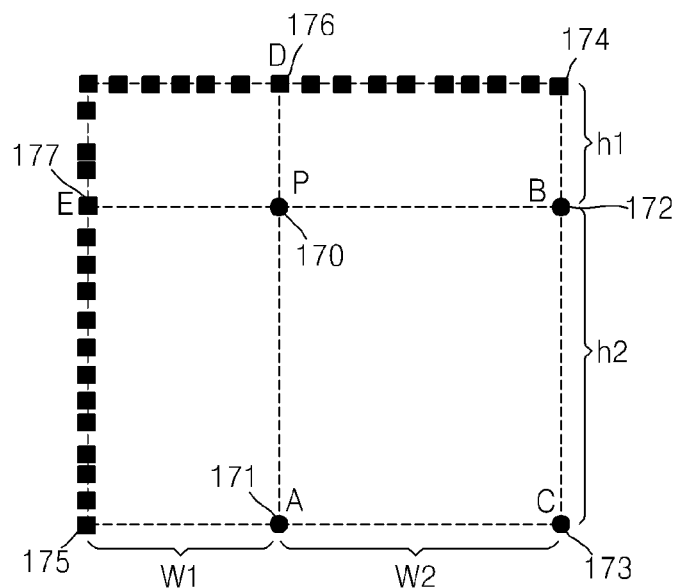
FIG. 17 is a reference diagram for explaining a bi-linear mode according to an exemplary embodiment.

FIG. 17 is a reference diagram for explaining a bi-linear mode according to an exemplary embodiment. Referring to FIG. 17, in the bi-linear mode, a geometric average is calculated by considering a value of a current pixel P 170 in a current coding unit, which is to be predicted, values of pixels on upper, lower, left, and right boundaries of the current coding unit, and the distances between the current pixel P 170 and the upper, lower, left, and right boundaries of the current coding unit, and is then used as a predictor of the current pixel P 170. For example, in the bi-linear mode, a geometric average calculated using a virtual pixel A 171, a virtual pixel B 172, a pixel D 176, and a pixel E 177 located to the upper, lower, left, and right sides of the current pixel P 170, and the distances between the current pixel P 170 and the upper, lower, left, and right boundaries of the current coding unit, is used as a predictor of the current pixel P 170. Since the bi-linear mode is one of intra prediction modes, neighboring pixels that have been previously encoded and restored and belong to previous coding units are used as reference pixels for prediction. Thus, values in the current coding unit are not used as pixel A 171 and pixel B 172 but virtual values calculated using neighboring pixels located to the upper and left sides of the current coding unit are used as the pixel A 171 and the pixel B 172.

Specifically, first, a value of a virtual pixel C 173 on a lower rightmost point of the current coding unit is calculated by calculating an average of values of a neighboring pixel (right-up pixel) 174 on an upper rightmost point of the current coding unit and a neighboring pixel (left-down pixel) 175 on a lower leftmost point of the current coding unit, as expressed in the following equation:

$$C=0.5(\text{LeftDownPixel}+\text{RightUpPixel}) \quad (1)$$

Next, a value of the virtual pixel A 171 located on a lowermost boundary of the current coding unit when the current pixel P 170 is extended downward by considering the distance W1 between the current pixel P 170 and the left boundary of the current coding unit and the distance W2 between the current pixel P 170 and the right boundary of the current coding unit, is calculated by using the following equation:

$$A=(C*W1+\text{LeftDownPixel}*W2)/(W1+W2) \quad (2)$$

Similarly, a value of the virtual pixel B 172 located on a rightmost boundary of the current coding unit when the current pixel P 170 is extended in the right direction by considering the distance h1 between the current pixel P 170 and the upper boundary of the current coding unit and the distance h2 between the current pixel P 170 and the lower boundary of the current coding unit, is calculated by using the following equation:

$$B=(C*h1+\text{RightUpPixel}*h2)/(h1+h2) \quad (3)$$

When the values of the virtual pixels A and B are determined using Equations (1) to (3), an average of the values of the pixels A 171, the pixel B 172, the pixel D 176, and the pixel E 177 may be used as a predictor of the current pixel P 170. As descried above, in the bi-linear mode, a predicted coding unit of the current coding unit may be obtained by performing bi-linear prediction on all pixels included in the current coding unit.

According to an exemplary embodiment, prediction encoding is performed according to one of various intra prediction modes determined according to the size of a coding unit, thereby allowing efficient video compression based on characteristics of an image.

As described above, a predicted coding unit produced using an intra prediction mode determined according to the size of a current coding unit by the predictor 1210 of the intra prediction apparatus 1200 of FIG. 12, has directionality according to the intra prediction mode. The directionality in the predicted coding unit may lead to an improvement in prediction efficiency when pixels of the current coding unit that is to be predicted have a predetermined directionality but may lead to a degradation in prediction efficiency when these pixels do not have a predetermined directionality. Thus, the post-processor 1220 may improve prediction efficiency by producing a new predicted coding unit by changing values of pixels in the predicted coding unit by using the pixels in the predicted coding unit and at least one neighboring pixel, as post-processing for the predicted coding unit produced through intra prediction.

A method of post-processing a predicted coding unit by the post-processor 1220 of FIG. 12, will now be described.

The post-processor 1220 produces a second predicted coding unit by changing values of pixels constituting a first predicted coding unit produced by the predictor 1210 by performing an operation by using the pixels of the first predicted coding unit and at least one neighboring pixel. Here, the predictor 1220 produces the first predicted coding unit by using an intra prediction mode determined according to a size of a current coding unit, as described above.

Figure 18:
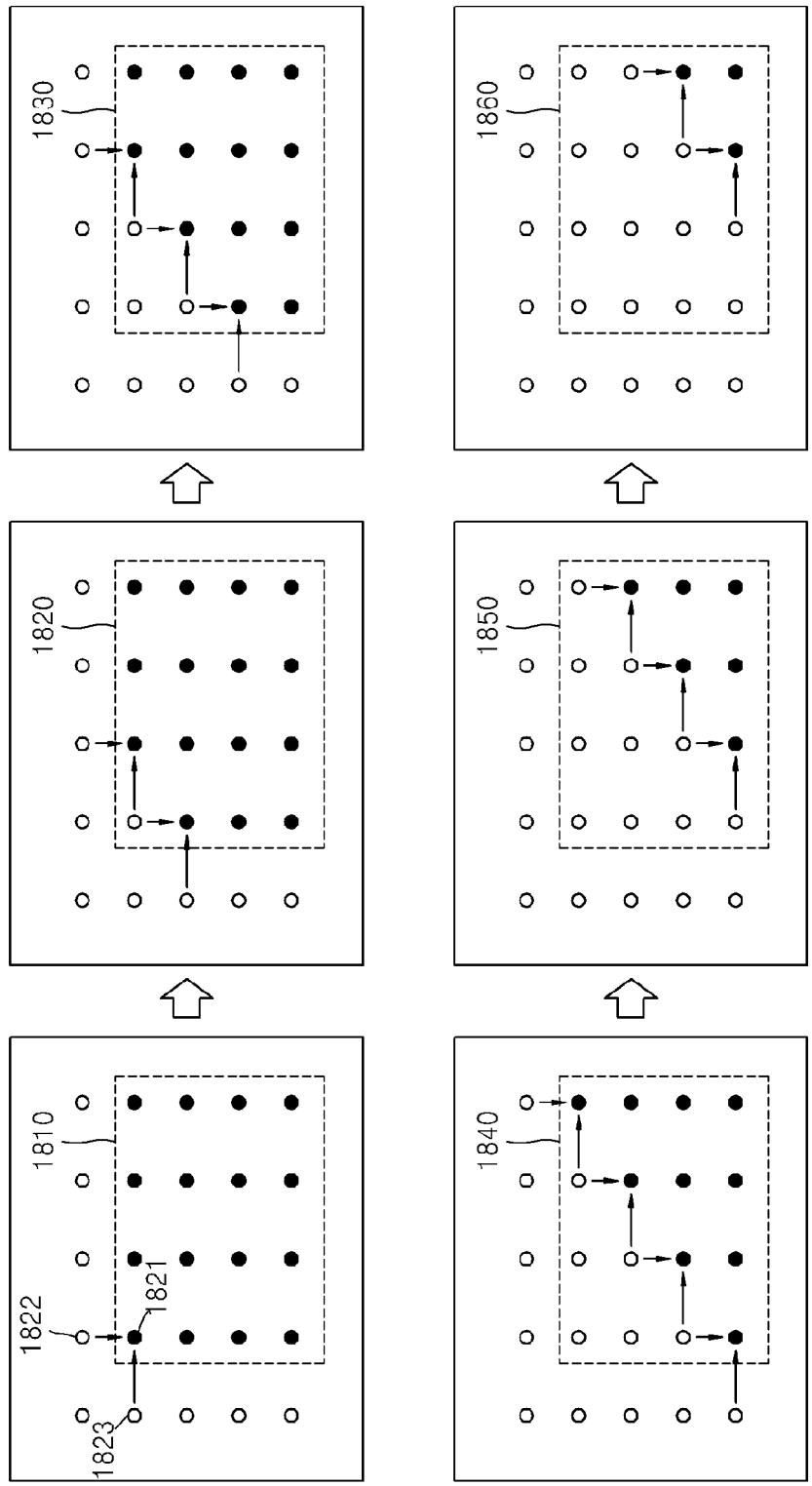
FIG. 18 is a reference diagram for explaining post-processing of a first predicted coding unit, according to an exemplary embodiment.

FIG. 18 is a reference diagram for explaining post-processing of a first predicted coding unit, according to an exemplary embodiment. In FIG. 18, reference numerals 1810 to 1860 illustrate a process of changing values of pixels in the first predicted coding unit by the post-processor 1220 in chronological order.

Referring to FIG. 18, the post-processor 1220 changes values of pixels in the first predicted coding unit 1810 by calculating a weighted average of values of a pixel in the first predicted coding unit 1810, which is to be changed, and neighboring pixels of the pixel. For example, referring to FIG. 18, if a value of a pixel 1821 of the first predicted coding unit 1810, which is to be changed, is f[1][1], a value of a pixel 2022 located above the pixel 1821 is f[0][1], a pixel 1823 located to the left side of the pixel 1821 is f[1][0], and a result of changing the value f[1][1] of the pixel 1821 is f'[1][1], then f'[1][1] may be calculated using the following equation:

$$f'[1][1] = \frac{f[0][1] + f[1][0] + 2*f[1][1]}{4} \quad (1)$$

As illustrated in FIG. 18, the post-processor 1220 changes values of pixels included in the first predicted coding unit 1810 by calculating a weighted average of the values of each of the pixel of the first predicted coding unit and pixels located above and to the left side of the pixel in a direction from an upper leftmost point of the first predicted coding unit to a lower rightmost point of the first predicted coding unit. However, such a post-processing operation according to the exemplary embodiments are not limited thereto, and may be sequentially performed on the pixels of the first predicted coding unit in a direction from a upper rightmost point of the first predicted coding unit to a lower leftmost point of the first predicted coding unit or a direction from the lower rightmost point of the first predicted coding unit to the upper leftmost point of the first predicted coding unit. For example, if the post-processor 1220 changes the values of the pixels of the first predicted coding unit in the direction from the upper rightmost point to the lower leftmost point unlike as illustrated in FIG. 18, then the values of the pixels of the first predicted coding unit are changed by calculating a weighted average of the values of each of the pixels of the first predicted coding unit and pixels located below and to the right side of the first predicted coding unit.

Figure 19:
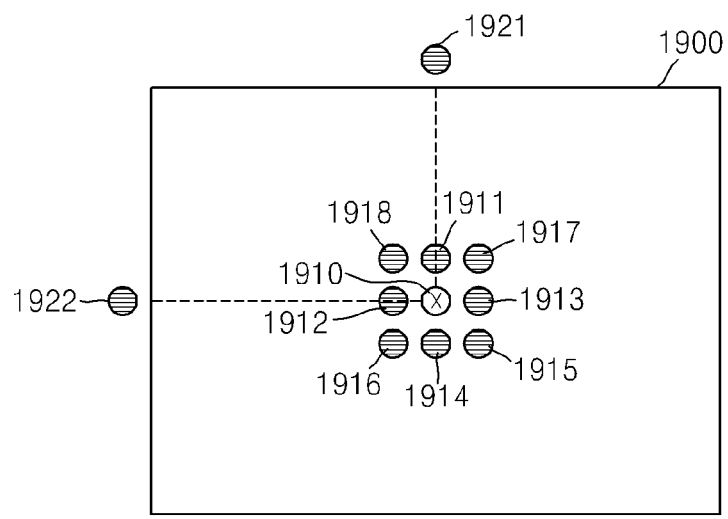
FIG. 19 is a reference diagram for explaining an operation of a post-processor according to an exemplary embodiment.
Figure 20:
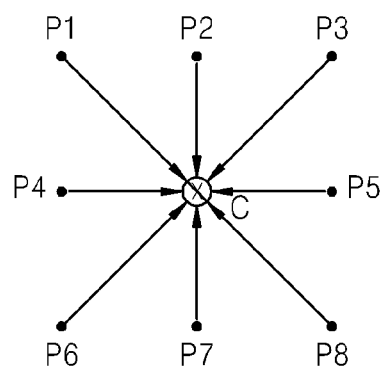
FIG. 20 is a reference diagram for explaining neighboring pixels to be used by a post-processor according to an exemplary embodiment.

FIGS. 19 and 20 are reference diagrams for explaining an operation of the post-processor 1220 of FIG. 12 according to exemplary embodiments. In FIG. 19, reference numeral 1910 denotes a first pixel of a first predicted coding unit 1900, which is to be changed, and reference numerals 1911 to 1918 denote neighboring pixels of the first pixel 1910.

In the current exemplary embodiment (first exemplary embodiment) of FIG. 19, neighboring pixels of the first pixel 1910 are not limited to those located above and to the left side of the first predicted coding unit, unlike as illustrated in FIG. 18. Referring to FIG. 19, the post-processor 1220 may post-process the first pixel 1910 by using a predetermined number of neighboring pixels selected from among the neighboring pixels 1911 to 1918. That is, referring to FIG. 20, a predetermined number of pixels are selected from among neighboring pixels P1 to P8 of a first pixel c of a current coding unit, and a value of the first pixel c is changed by performing a predetermined operation on the selected neighboring pixels and the first pixel c. For example, if the size of the first predicted coding unit 1900 is m×n, a value of the first pixel 1910, which is to be changed and is located at an $i^{th}$ column and a $j^{th}$ row of the first predicted coding unit 1900, is f[i][j], values of n pixels selected from among the neighboring pixels 1911 to 1918 of the first pixel 1910 so as to post-process the first pixel 1910 are f1 to fn, respectively, then the post-processor 1220 changes the value of the first pixel 1910 from f[i][j] to f'[i][j] by using the following equation. Here, m denotes a positive integer, n is '2' or '3', i denotes an integer from 0 to m−1, and j denotes an integer from 0 to n−1.

$$f'[i][j] = \frac{f1 + f2 + 2 \times f[i][j]}{4} \quad (n = 2) \quad (2)$$

$$f'[i][j] = \frac{f1 + f2 + f3 + f[i][j]}{4} \quad (n = 3)$$

The post-processor 1220 produces a second predicted coding unit by changing values of all pixels included in the first predicted coding unit 1900 by using Equation (2). In Equation (2), three neighboring pixels are used, but the exemplary embodiments are not limited thereto and the post-processor 1220 may perform post-processing by using four or more neighboring pixels.

According to a second exemplary embodiment, the post-processor 1220 produces a second predicted coding unit by changing the value of each pixel of the first predicted coding unit 1900 by using a weighted harmonic average of the values of a pixel of the first predicted coding unit 1900, which is to be changed, and neighboring pixels of the pixel.

For example, the post-processor 1220 changes the value of a pixel at the $i^{th}$ column and the $j^{th}$ row of the first predicted coding unit 1900 from f[i][j] to f'[i][j] by using neighboring pixels located above and to the left side of the pixel, as shown in the following equation:

$$f'[i][j] = \frac{\alpha + \beta + \gamma}{\frac{\alpha}{f[i-1][j]} + \frac{\beta}{f[i][j-1]} + \frac{\gamma}{f[i][j]}}, \quad (3)$$

wherein α, β, and γ denote positive integers, and for example, α=2, β=2, and γ=1.

According to a third exemplary embodiment, the post-processor 1220 produces a second predicted coding unit by changing the value of each pixel of the first predicted coding unit 1900 by using a weighted geometric average of values of a pixel of the first predicted coding unit 1900, which is to be changed, and neighboring pixels of the pixel.

For example, the post-processor 1220 changes the value of a pixel at the $i^{th}$ column and the $j^{th}$ row of the first predicted coding unit 1900 from f[i][j] to f'[i][j] by using neighboring pixels located above and to the left side of the pixel, as shown in the following equation:

$$f'[i][j] = (f[i-1][j]^\alpha * f[i][j-1]^\beta * f[i][j]^\gamma)^{\frac{1}{(\alpha+\beta+\gamma)}}, \quad (4)$$

wherein $\alpha$, $\beta$, and $\gamma$ denote positive integers, and for example, $\alpha=1$, $\beta=1$, and $\gamma=2$. In Equation (2) to (4), a relative large weight is assigned to the value f[i][j] of the pixel that is to be changed.

As described above, in the first to third exemplary embodiments, the post-processor 1220 may perform post-processing by using not only neighboring pixels located above and to the left side of a pixel that is to be changed, but also a predetermined number of neighboring pixels selected from among the neighboring pixels 1911 to 1918 as illustrated in FIG. 19.

According to a fourth exemplary embodiment, the post-processor 1220 produces a second predicted coding unit by changing the value of each pixel in the first predicted coding unit by using an average of the values of a pixel in the first predicted coding unit, which is to be changed, and one selected from among neighboring pixels of the pixel.

For example, the post-processor 1220 changes the value of a pixel at the $i^{th}$ column and the $j^{th}$ row of the first predicted coding unit 1900 from f[i][j] to f'[i][j] by using neighboring pixels located above the pixel, as shown in the following equation:

$$f'[i][j] = \frac{f[i-1][j] + f[i][j]}{2} \quad (5)$$

Similarly, according to a fifth exemplary embodiment, the post-processor 1220 produces a second predicted coding unit by changing the value of each pixel in the first predicted coding unit by using an average of the values of a pixel in the first predicted coding unit, which is to be changed, and neighboring pixels located to the left side of the pixel.

In other words, the post-processor 1220 changes the value of a pixel at the $i^{th}$ column and the $j^{th}$ row of the first predicted coding unit 1900 from f[i][j] to f'[i][j], as shown in the following equation:

$$f'[i][j] = \frac{f[i][j-1] + f[i][j]}{2} \quad (6)$$

According to a sixth exemplary embodiment, the post-processor 1220 produces a second predicted coding unit by changing the value of each pixel in the first predicted coding unit by using a median between the values of a pixel of the first predicted coding unit, which is to be changed, and neighboring pixels of the pixel. Referring back to FIG. 19, for example, it is assumed that the value f[i][j] of the first pixel 1910 at the $i^{th}$ column and the $j^{th}$ row of the first predicted coding unit 1900, the value f[i][j−1] of the second pixel 1912, and the value f[i−1][j] of the third pixel 1911 have a relation of f[i][j−1]>f[i−1][j]>f[i][j]. In this case, the post-processor 1220 changes the value f[i][j] of the first pixel 1910 to the median f[i−1][j] among the first to third pixels 1910 to 1912.

In seventh to ninth exemplary embodiments, the post-processor 1220 produces a second predicted coding unit by using previous coding units adjacent to a current coding unit, which have been previously encoded and restored, rather than by using neighboring pixels of a pixel that is to be changed.

Referring back to FIG. 19, in the seventh exemplary embodiment, the post-processor 1220 changes the value of the first pixel 1910 to f'[i][j] by calculating an average of the value of the first pixel 1910 at the $i^{th}$ column and the $j^{th}$ row of the first predicted coding unit 1900 and the value of the pixel 1921 that is located at the same column as the first pixel 1910 and included in a coding unit adjacent to the top of the current coding unit, as shown in the following equation:

$$f'[i][j] = \frac{f[i][j] + f[-1][j]}{2}, \quad (7)$$

wherein f[−1][j] denotes the value of the pixel 1921.

Similarly, in the eighth exemplary embodiment, the post-processor 1220 changes the value of the first pixel 1910 to f'[i][j] by calculating an average of the value of the first pixel 1910 at the $i^{th}$ column and the $j^{th}$ row of the first predicted coding unit 1900 and the value of the pixel 1922 that is located at the same row as the first pixel 1910 and included in a coding unit adjacent to the left side of the current coding unit, as shown in the following equation:

$$f'[i][j] = \frac{f[i][j] + f[i][-1]}{2}, \quad (8)$$

wherein f[i][−1] denotes the value of the pixel 1922.

In the ninth exemplary embodiment, the post-processor 1220 changes the value of the first pixel 1910 to f'[i][j] by calculating a weighted average of the values of the first pixel 1910 at the $i^{th}$ column and the $j^{th}$ row of the first predicted coding unit 1900, the pixel 1921 located at the same column as the first pixel 1910 and included in a coding unit adjacent to the top of the current coding unit, and the pixel 1922 located at the same row as the first pixel 1910 and included in a coding unit adjacent to the left side of the current coding unit, as shown in the following equation:

$$f'[i][j] = \frac{2f[i][j] + f[-1][j] + f[i][j-1]}{4} \quad (9)$$

In a tenth exemplary embodiment, the post-processor 1220 changes the value of the first pixel 1910 of the first predicted coding unit 1900, which is to be changed, from f[i][j] to f'[i][j] by using one of the following equations.

$$f'[i][j]=\min(f[i][j]+i, 255) \quad (10)$$

$$f'[i][j]=\min(f[i][j]+j, 255) \quad (11)$$

$$f'[i][j]=\max(f[i][j]-i, 0) \quad (12)$$

$$f'[i][j]=\max(f[i][j]-j, 0) \quad (13)$$

In Equation (10), the values of the first predicted coding unit 1900 are changed to gradually increase from top to bottom, in column units of the first predicted coding unit 1900. In Equation (11), the values of the first predicted coding unit 1900 are changed to gradually increase in a right direction, in row units of the first predicted coding unit 1900. In Equation (12), the values of the first predicted coding unit 1900 are changed to gradually decrease from top to bottom, in column units of the first predicted coding unit 1900. In Equation (13), the values of the first predicted coding unit 1900 are changed to gradually decrease in the right direction, in row units of the first predicted coding unit 1900.

In an eleventh exemplary embodiment, if the value of the first pixel 1910, which is located at the ith column and the jth row of the first predicted coding unit 1900 and is to be changed, is f[i][j], the value of a pixel located at an upper leftmost point of the first predicted coding unit 1900 is f[0][0], the value of a pixel located at the jth row as the first pixel 1910 and at the leftmost point of the first predicted coding unit 1900 is f[0][j], the value of a pixel located at the ith column as the first pixel 1910 and at the uppermost point of the first predicted coding unit is f[i][0], and G[i][j]=f[i][0]+f[0][j]−f[0][0], then the post-processor 1220 changes the value of the first pixel 1910 to f'[i][j], as shown in the following equation:

$$f'[i][j]=(f[i][j]+G[i][j])/2 \qquad (14)$$

Equation (14) is based on a wave equation, in which the value of each pixel in the first predicted coding unit 1900 is changed by calculating the value G[i][j] by setting the values of a pixel on the uppermost row of and a pixel on the leftmost column of the first predicted coding unit 1900 to be boundary conditions so as to smooth the value of each pixel in the first predicted coding unit 1900, and then calculating an average of the values G[i][j] and f[i][j].

Costs of bitstreams containing results of encoding second predicted coding units produced using various operation modes according to the above first through eleventh exemplary embodiments, respectively, are compared to one another. Then, the operation mode having the minimum cost is added to a header of a bitstream from among the various operation modes. When the operation mode is added to the bistream, it is possible to represent different operation modes to be differentiated from one another by using variable-length coding, in which a small number of bits are assigned to an operation mode that is most frequently used, based on a distribution of the operation mode determined after encoding of a predetermined number of coding units is completed. For example, if an operation mode according to the first exemplary embodiment is an optimum operation leading to the minimum cost of most coding units, a minimum number of bits are assigned to an index indicating this operation mode so that this operation mode may be differentiated from the other operation modes.

When a coding unit is split to sub coding units and prediction is performed in the sub coding units, a second predicted coding unit may be produced by applying different operation modes to the sub coding units, respectively, or by applying the same operation mode to sub coding units belonging to the same coding unit so as to simplify calculation and decrease an overhead rate.

A rate-distortion optimization method may be used as a cost for determining an optimum operation mode. Since a video encoding method according to an exemplary embodiment is performed on an intra predicted coding unit used as reference data for another coding unit, a cost may be calculated by allocating a high weight to a distortion, compared to the rate-distortion optimization method. That is, in the rate-distortion optimization method, a cost is calculated, based on a distortion that is the difference between an encoded image and the original image and a bitrate generated, as shown in the following equation:

$$\text{Cost}=\text{distortion}+\text{bit-rate} \qquad (15)$$

In contrast, in a video encoding method according to an exemplary embodiment, an optimum post-processing mode is determined by allocating a high weight to a distortion, compared to the rate-distortion optimization method, as shown in the following equation:

$$\text{Cost}=\alpha*\text{distortion}+\text{bit-rate } (\alpha \text{ denotes a real number equal to or greater than '2'}) \qquad (16)$$

Figure 21:
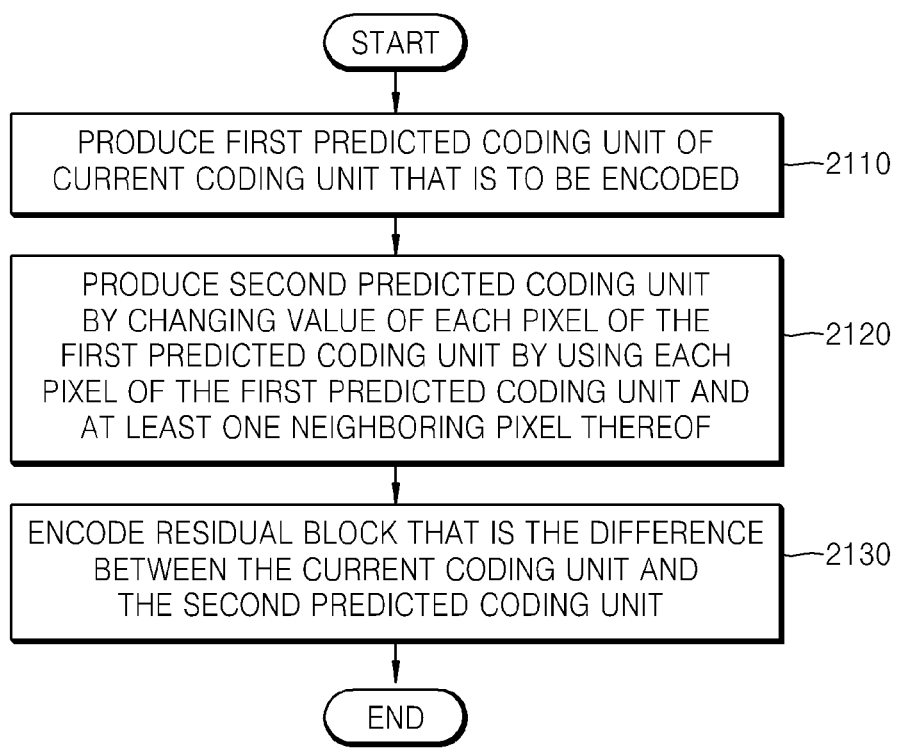
FIG. 21 is a flowchart illustrating a method of encoding video according to an exemplary embodiment.

FIG. 21 is a flowchart illustrating a method of encoding video according to an exemplary embodiment. Referring to FIG. 21, in operation 2110, a first predicted coding unit of a current coding unit that is to be encoded, is produced. The first predicted coding unit is an intra predicted block produced by performing a general intra prediction method, and one of various intra prediction modes having various directionalities, which is determined by the size of a coding unit.

In operation 2120, a second predicted coding unit is produced by changing a value of each pixel of the first predicted coding unit by using each pixel of the first predicted coding unit and at least one neighboring pixel. As described above in the first through eleventh exemplary embodiments regarding an operation of the post-processor 1220, the second predicted coding unit may be produced by changing the value of each pixel in the first predicted coding unit by performing one of various operation modes on a pixel of the first predicted coding unit, which is to be changed, and neighboring pixels thereof.

In operation 2130, a residual block that is the difference between the current coding unit and the second predicted coding unit, is transformed, quantized, and entropy encoded so as to generate a bitstream. Information regarding the operation mode used to produce the second predicted coding unit may be added to a predetermined region of the generated bitstream, so that a decoding apparatus may reproduce the second predicted coding unit of the current coding unit.

FIG. 22 is a flowchart illustrating a method of decoding video according to an exemplary embodiment. Referring to FIG. 22, in operation 2210, information regarding a prediction mode related to a current decoding unit that is to be decoded, is extracted from a received bitstream.

In operation 2220, a first predicted decoding unit of the current decoding unit is reproduced according to the extracted information.

In operation 2230, information regarding an operation mode in which each pixel of the first predicted decoding unit and neighboring pixels of each pixel are used, is extracted from the bitstream.

In operation 2240, a second predicted decoding unit is reproduced by changing a value of each pixel of the first predicted decoding unit by using each pixel of the first predicted decoding unit and neighboring pixels thereof, based on the information regarding the operation mode.

In operation 2250, a residual block that is the difference between the current decoding unit and the second predicted decoding unit is extracted from the bitstream, and is reconstructed.

In operation 2260, the residual block and the second predicted decoding unit are combined to decode the current decoding unit.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of decoding a video image, the method comprising:

determining coding units of a hierarchical structure by using information about whether to divide a coding unit parsed from a received bitstream;

obtaining a first predicted value of a current coding unit, among the determined coding units, by using neighboring pixels of the current coding unit;

obtaining a second predicted value of each of pixels of the current coding unit located on a top border and a left border of the current coding unit by using at least one neighboring pixel adjacent to each of the pixels located on the top border and the left border of the current coding unit; and obtaining a final predicted value of the current coding unit by using the obtained first predicted value and the obtained second predicted value, wherein the final predicted value of the current coding unit is obtained by using a weighted average of the obtained first predicted value and the obtained second predicted value with weights depending on size of the coding unit to be predicted.

2. The method of claim 1, wherein the second predicted value of a pixel located on a top-left of the current coding unit is obtained by using both a first pixel, which is located at a same column as the pixel located on the top-left of the current coding unit and included in a border of a coding unit adjacent to the top border of the current coding unit, and a second pixel, which is located at a same row as the pixel located on the top-left of the current coding unit and included in a border of a coding unit adjacent to the left border of the current coding unit.

3. The method of claim 1, wherein the second predicted value of a pixel located on the top border of the current coding unit is obtained by using a third pixel, which is located at a same column as the pixel located on the top border of the current coding unit and included in a border of a coding unit adjacent to the top border of the current coding unit.

4. The method of claim 1, wherein a value of the second predicted value of a pixel located on the left border of the current coding unit is obtained by using a fourth pixel, which is located at a same row as the pixel located on the left border of the current coding unit and included in a border of a coding unit adjacent to the left border of the current coding unit.

* * * * *